United States Patent [19]

Yoshimi et al.

[11] Patent Number: 5,530,468

[45] Date of Patent: Jun. 25, 1996

[54] APPARATUS FOR AND OF RECORDING AN IMAGE USING A PHOTOSENSITIVE DRUM FOR EXPOSURE AND HAVING A BUILT-IN WEB CUTTING ASSEMBLY

[75] Inventors: Yasuhito Yoshimi; Toru Kawada; Hiroyuki Fujisawa; Takashi Kakihara; Makoto Urata; Hiroshi Okamoto, all of Kyoto, Japan

[73] Assignee: Dainippon Screen Mfg. Co., Ltd., Japan

[21] Appl. No.: 19,072

[22] Filed: Feb. 18, 1993

[30] Foreign Application Priority Data

Feb. 18, 1992 [JP] Japan .................... 4-069716

[51] Int. Cl.⁶ .................................................. B41J 2/435
[52] U.S. Cl. ............................................ 347/262; 347/264
[58] Field of Search .................... 346/108, 136, 346/138; 355/160, 51; 198/362, 366, 368, 389.1, 804, 831, 832.2, 832.3, 860; 310/76, 78; 83/401, 436; 30/347; 347/262, 264, 257

[56] References Cited

U.S. PATENT DOCUMENTS

| | | | |
|---|---|---|---|
| 3,781,902 | 12/1973 | Shim et al. ................... | 347/257 |
| 4,033,689 | 7/1977 | Washio et al. ................. | 355/51 |
| 4,294,540 | 10/1981 | Thettu ............................ | 198/689.1 |
| 4,367,948 | 1/1983 | Suzuki .............................. | 347/262 |
| 4,754,292 | 6/1988 | Itakura ............................ | 347/139 |
| 4,770,404 | 9/1988 | Ueyama et al. .. | |
| 5,151,713 | 9/1992 | Kawasaki et al. ............. | 347/262 |

FOREIGN PATENT DOCUMENTS

| | | |
|---|---|---|
| 54-61820 | 5/1979 | Japan . |
| 62-71955 | 4/1987 | Japan . |
| 62-169350 | 10/1987 | Japan . |
| 63-2051 | 1/1988 | Japan . |
| 63-175570 | 7/1988 | Japan . |

*Primary Examiner*—Nancy Le
*Assistant Examiner*—Raquel Yvette Gordon
*Attorney, Agent, or Firm*—Ostrolenk, Faber, Gerb & Soffen

[57] ABSTRACT

An image recording apparatus comprises a temporary storing magazine for temporarily retaining a recorded photosensitive material sheet. The temporary storing magazine stocks the recorded photosensitive sheet received therein from an image recording section while discharging the recorded photosensitive material sheet into an automatic developing machine. Hence, image recording is executed without interruption and parallel to discharge of the recorded photosensitive material sheet into the developing machine, enhancing the capability of the image recording apparatus.

13 Claims, 39 Drawing Sheets

APPARATUS FOR AND OF RECORDING AN IMAGE USING A PHOTOSENSITIVE DRUM FOR EXPOSURE AND HAVING A BUILT-IN WEB CUTTING ASSEMBLY

BACKGROUND OF THE INVENTION

1. Field of the Invention

The present invention relates to an apparatus for and a method of recording a desired image on a photosensitive film and discharging a recorded photosensitive film to a developing machine.

2. Description of the Prior Art

In an image recording apparatus, a recording drum rotates while reliably carrying thereon a photosensitive film which is cut into a sheet of a predetermined length, in synchronism with which an exposure head slides in a back-and-forth reciprocal movement substantially parallel to the rotational axis of the recording drum, whereby an image is reproduced on the sheet of the photosensitive film. The photosensitive film sheet on which the image is reproduced (hereinafter referred to as "recorded film sheet") is then conveyed to a developing machine where the film sheet is developed.

The developing machine must start development usually immediately following recording by the image recording of the recording apparatus. Hence, for the most part, the image recording apparatus and the automatic developing machine are used in linkage to each other. When linked to the image recording apparatus, the automatic developing machine develops the recorded film sheets which are fed thereto by rotation of the recording drum of the image recording apparatus. To ensure this, the speed of feeding the recorded film sheets to the automatic developing machine must be the same as the rate at which development proceeds in the automatic developing machine. Since in most cases development consumes much greater time than image recording, the recording drum needs to rotate slowly while the recorded film sheets are being discharged from the image recording apparatus. Hence, recording or the next image must wait until developing of the recorded film sheets is completed, which is an obstacle in making maximum use of the image recording apparatus.

SUMMARY OF THE INVENTION

The present invention is directed to an apparatus for recording an image on a photosensitive material sheet and discharging a recorded photosensitive material sheet into a developing machine in synchronism with an operation speed of the developing machine. The apparatus comprises: (a) image recording means for recording an image on a photosensitive material sheet and thereby producing the recorded photosensitive material sheet; (b) supply means for containing a long length of photosensitive material; (c) transport means for separating a photosensitive material sheet of a predetermined length from the long lenght of photosensitive material which is contained in the supply means and for thereafter feeding the separated photosensitive material sheet to the image recording means; (d) temporary storing means for temporarily retaining the recorded photosensitive material sheet which is produced by the image recording means; (e) discharge means for discharging the recorded photosensitive material sheet from the image recording means to the temporary storing means or otherwise from the temporary storing means to the developing machine; and (f) control means for coordinating actions of the means (a) to (c) in such a manner that cutting off of the photosensitive material sheet from the long sheet of photosensitive material and recording of the image onto the photosensitive material sheet proceed parallel to discharge of the recorded photosensitive material sheet, which has been temporarily retained in the temporary storing means, into the developing machine.

The present invention is also directed to a magazine, comprising: a body for temporarily storing a photosensitive material sheet, the body having a slit for conveying the photosensitive material sheet; a pair of rollers rotatably mounted to the body, the rollers being adjacent to the slit; an outer loop guide installed in the body, the outer guide for forming an endless path which runs on an contact area of the rollers; and a drive mechanism for rotating at least one of the rollers, wherein the rollers rotate by which the photosensitive material sheet is wound up along the endless path in the body while being nipped between the rollers, and wherein the rollers are rotated in reverse whereby the photosensitive material sheet is fed out of the body though the slit.

The present invention is also directed to a method of recording an image on a photosensitive material sheet which is held on a recording drum. The method comprises the steps of: (a) preparing an unexposed photosensitive material sheet of a predetermined length; (b) positioning the unexposed photosensitive material sheet on the recording drum; (c) applying suction to the unexposed photosensitive material sheet on the recording drum, whereby the unexposed photosensitive material sheet is held on the recording drum; (d) locating the recording drum which holds the unexposed photosensitive material sheet at a relaxation point, the relaxation point being a point where an intermediate point between the leading and the rear margins of the unexposed photosensitive material sheet is located substantially on a line drawn upright from the rotation shaft of the recording drum; (e) performing relaxation treatment, the relaxation treatment including the steps of releasing the unexposed photosensitive material sheet on the recording drum from the suction for a predetermined period of time and then reapplying suction to the unexposed photosensitive material sheet to again same on the recording drum; and (f) recording an image on the unexposed photosensitive material sheet which is held on the recording drum again.

The present invention is also directed to a method of recording an image on a photosensitive material sheet which is held on a recording drum; the method comprising the steps of: (a) preparing an unexposed photosensitive material sheet of a predetermined length; (b) positioning the unexposed photosensitive material sheet on the recording drum; (c) applying suction to the unexposed photosensitive material sheet on the recording drum, whereby the unexposed photosensitive material sheet is held on the recording drum; (d) locating the recording drum which holds the unexposed photosensitive material sheet at a relaxation point, the relaxation point being a point where an intermediate point between the leading and the rear margins of the unexposed photosensitive material sheet is located substantially on a line drawn upright from the rotation shaft of the recording drum; (e) performing relaxation treatment, the relaxation treatment including the steps of reducing the suction force being applied to the unexposed photosensitive material sheet on the recording drum for a predetermined period of time and thereafter increasing the suction force to the former level at least once; and (f) recording an image on the unexposed photosensitive material sheet which is applied the relaxation treatment.

Accordingly, it is an object of the present invention to offer an image recording apparatus which is, even when used in combination with a developing machine, capable of executing image recording separately from discharge of a recorded film sheet to the developing machine.

Another object is to provide a magazine of simple construction which retains a photosensitive material sheet always in the same state.

Another object is to provide a magazine which retains a photosensitive material sheet without a reel.

Another object is to provide a method of recording an image on a photosensitive material sheet, in which the photosensitive material has no distortion thereby, attaining an enhanced recording accuracy.

These and other objects, features, aspects and advantages of the present invention will become more apparent from the following detailed description of the present invention when taken in conjunction with the accompanying drawings.

DESCRIPTION OF THE PREFERRED EMBODIMENTS

A. GENERAL STRUCTURE OF APPARATUS

Figure 1:
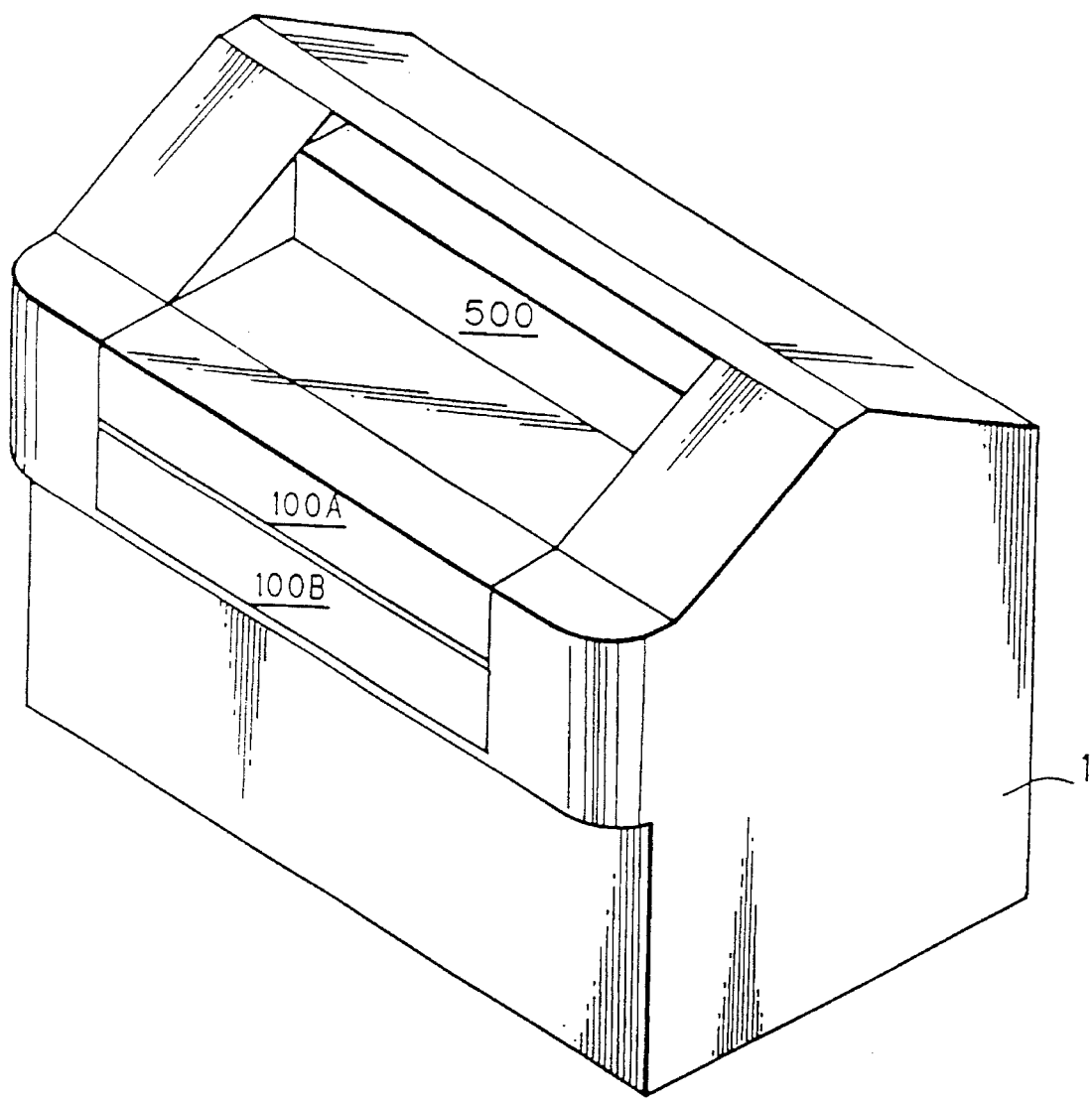
FIG. 1 is a perspective of an image recording apparatus according to a preferred embodiment of the present invention.
Figure 2:
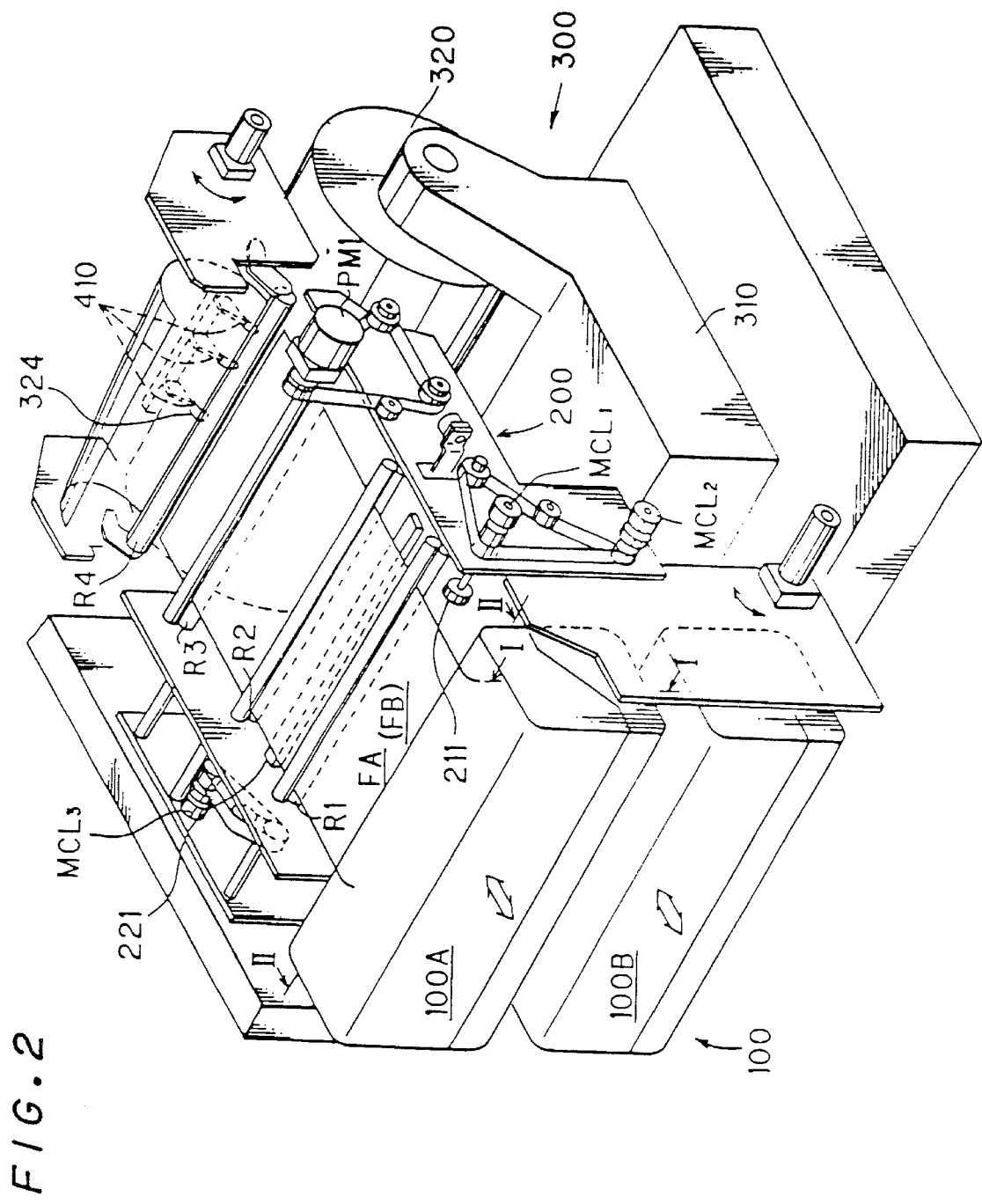
FIG. 2 is a perspective showing a part of the image recording apparatus of FIG. 1.

FIG. 1 shows the appearance in perspective of an image recording apparatus according to a preferred embodiment of the present invention, and FIG. 2 is a partial perspective of the image recording apparatus as it is when its cover 1 is removed. The image recording apparatus incorporates three magazines 100A, 100B and 500, each detachable from the image recording apparatus at the front face of the apparatus. Of the three magazines, the supply magazines 100A and 100B are mounted to the image recording apparatus in the front center portion. Unexposed new photosensitive films FA and FB are respectively placed in the supply magazines 100A and 100B. The temporary storing magazine 500 is inserted into the image recording apparatus in the top portion. A recorded film sheet and the like are held a temporarily in the temporary storing magazine 500 as described later.

Figure 3:
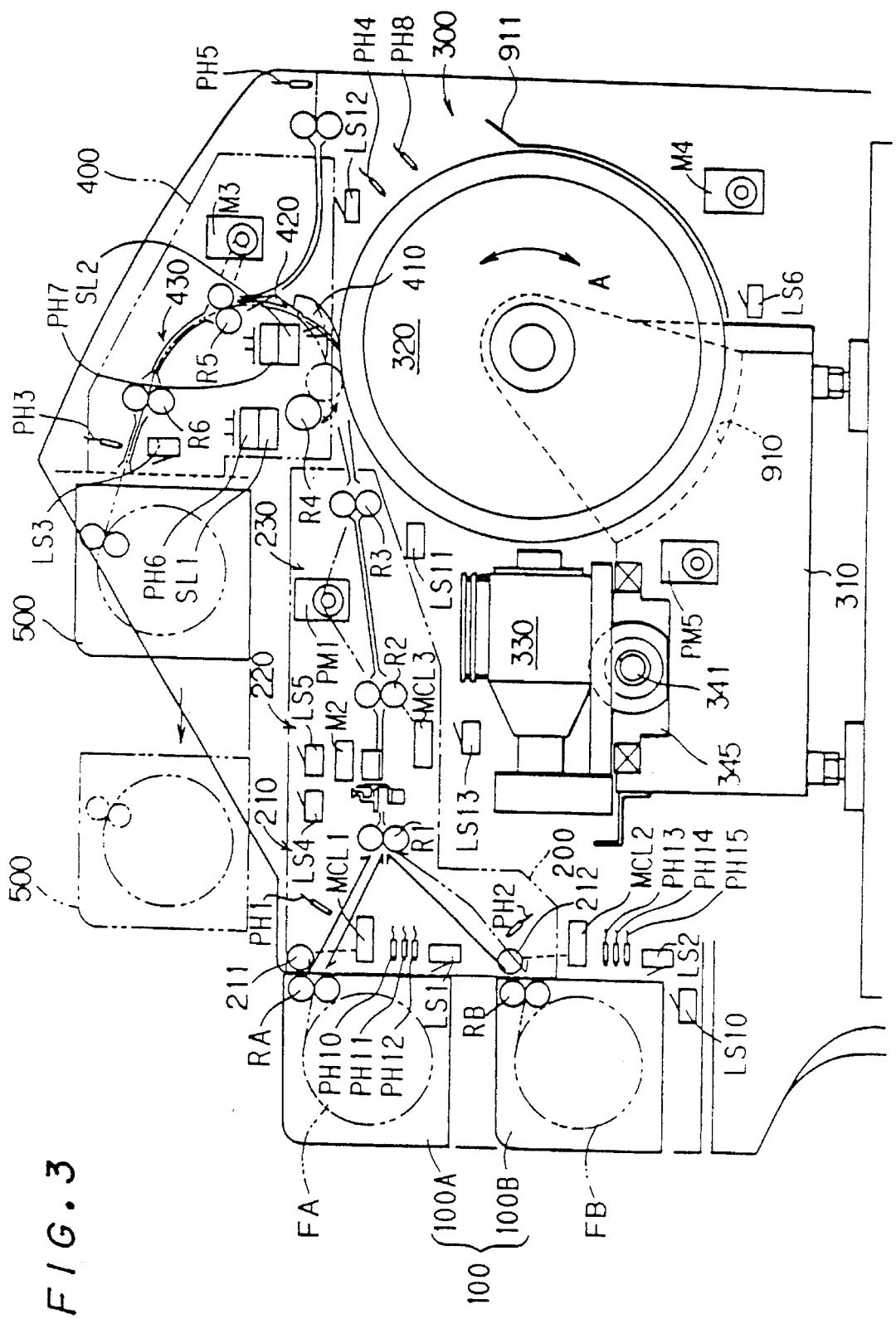
FIG. 3 is a transverse of the image recording apparatus of FIG. 1.

FIG. 3 is a cross sectional view of the image recording apparatus. In FIG. 3, the image recording apparatus includes a transport section 200. A photosensitive film FA (or FB) is pulled out of a supply section 100 which is comprised of the supply magazines 100A and 100B, and severed at a predetermined cutting point in the transport section 200 so that a film sheet F of a preselected length (e.g., a length L) is separated from the photosensitive film FA (or FB). The transport section 200 sends the film sheet F to an image recording section 300 where a desired image is recorded onto the film sheet F.

A recording drum 320 is mounted for free rotation in the direction of the arrow A above a frame 310 in the image recording section 300. The image recording section 300 also houses an exposure head 330 which freely slides parallel to the rotation shaft of the recording drum 320 (i.e., perpendicular to the plane of the drawing). The exposure head 330 slides in synchronism with the rotation of the recording drum 320 while illuminating a laser beam onto the film sheet F which is wound around the recording drum 320, thereby a desired image being recorded on the film sheet F. As a result, a recorded film sheet EF which has the length L and which carries the desired image thereon is produced in the image recording section 300.

The image recording apparatus also houses a discharge section 400 which is disposed above the image recording section 300. The discharge section 400 includes a strip nail 410 which strips a recorded film sheet from the recording drum 320 (described in greater detail later) and a discharge mechanism 430 that advances the recorded film sheet which left the recording drum 320, in the direction of temporary storing magazine 500. The recorded film sheets thus discharged are temporarily retained in the temporary storing magazine 500. Another function of the discharge section 400 is to draw the recorded film sheets out of the temporary storing magazine 500 by the discharge mechanism 430 and discharge them to the automatic developing machine (not shown) by the discharge mechanism 430 whenever it is necessary.

With the construction described wherein the temporary storing magazine 500 is disposed above the image recording section 300 and the discharge section 400 transfers the recorded film sheets from the image recording section 300 to the temporary storing magazine 500 and from the temporary storing magazine 500 to the automatic developing machine, the image recording apparatus is reduced in terms of the space occupied by the film sheet transportation section and in terms of the plane space for the apparatus.

B. DETAILED STRUCTURES OF RESPECTIVE SECTIONS OF APPARATUS

In the following, the respective sections of the apparatus will be described in detail.

B-1. SUPPLY SECTION 100

Figure 4:
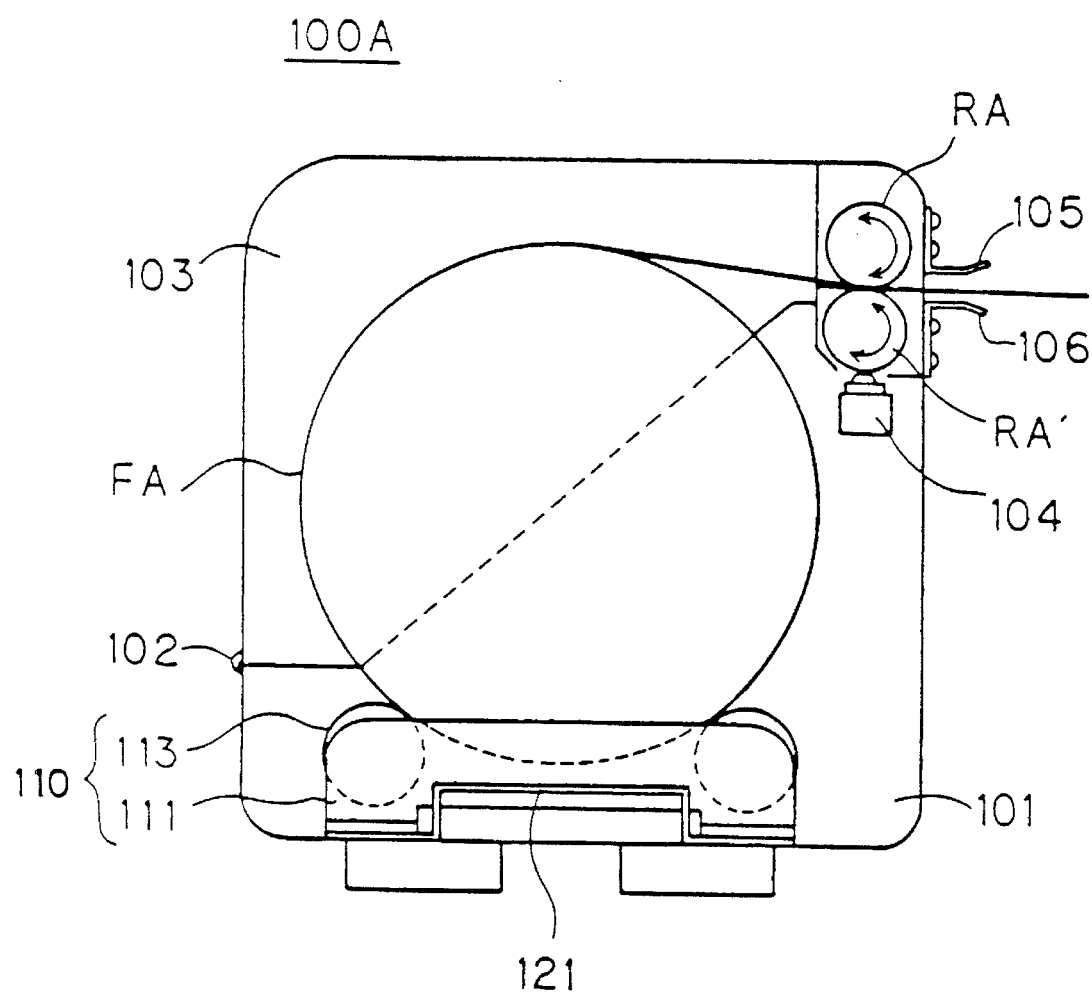
FIG. 4 is a simplified cross-section of the image recording apparatus of FIG. 1 taken along I—I of FIG. 2.

FIG. 4 is a schematic cross sectional view of the supply magazine 100A as viewed from the I—I direction of FIG. 2. The supply magazine 100A is composed of a bottom cover 101 which has an opening (i.e., film in-out opening) through which the photosensitive film FA is taken out upwards (towards the top margin of the drawing) and a top cover 103 which is hingedly connected to the bottom cover 101 for swing movement about a hinge 102. The top and the bottom covers 103 and 101 respectively carry rollers RA and RA'. As shown in FIG. 4, the rollers RA and RA' come into contact when the top cover 103 is closed into engagement with the bottom cover 101. Immediately under the roller RA', a small plunger 104 is installed which pushes the roller RA' upwards. Since the roller RA' is urged against the roller RA at a certain stress by the plunger 104, the rollers RA and RA' always form a tight nip therebetween when in contact with each other. The top and the bottom covers 103 and 101 also carry a top guide plate 105 and a bottom guide plate 106, respectively.

Figure 5:
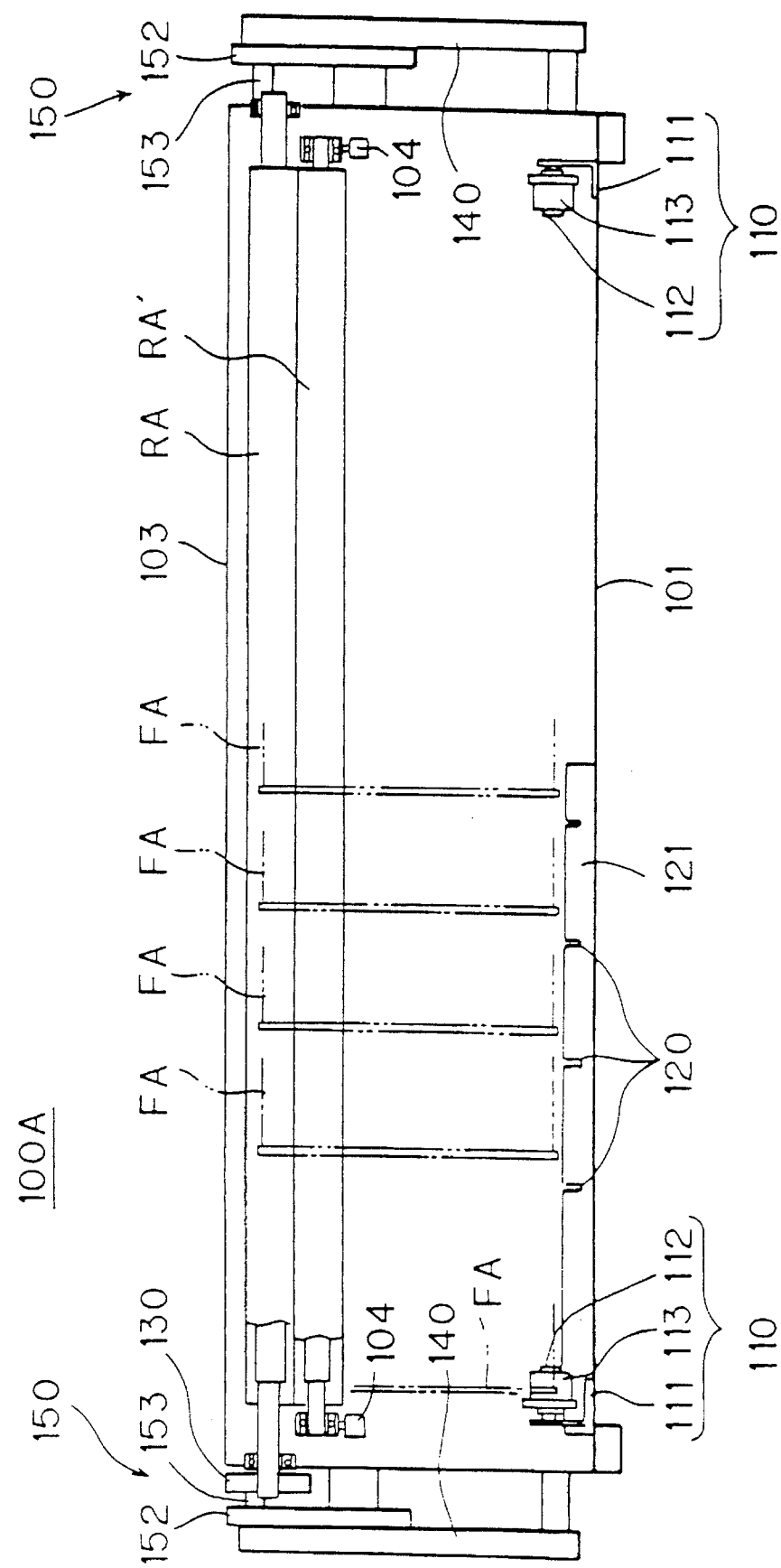
FIG. 5 is a simplified cross-section of the image recording apparatus of FIG. 1 taken along II—II of FIG. 2.

FIG. 5 is a schematic cross sectional view of the supply magazine 100A as viewed from the II—II direction of FIG. 2. In FIG. 5, a film support unit 110 is fixed of the bottom surface of the bottom cover 101 at one end portion (rightmost part of the drawing). To the other end portion of the bottom surface of the bottom cover 101 (leftmost part of the drawing), a positioning plate 121 is secured on which a plurality of positioning slits 120 is formed. Another film support unit 110 is inserted in different positioning slits 120 depending on the film width.

Figure 6:
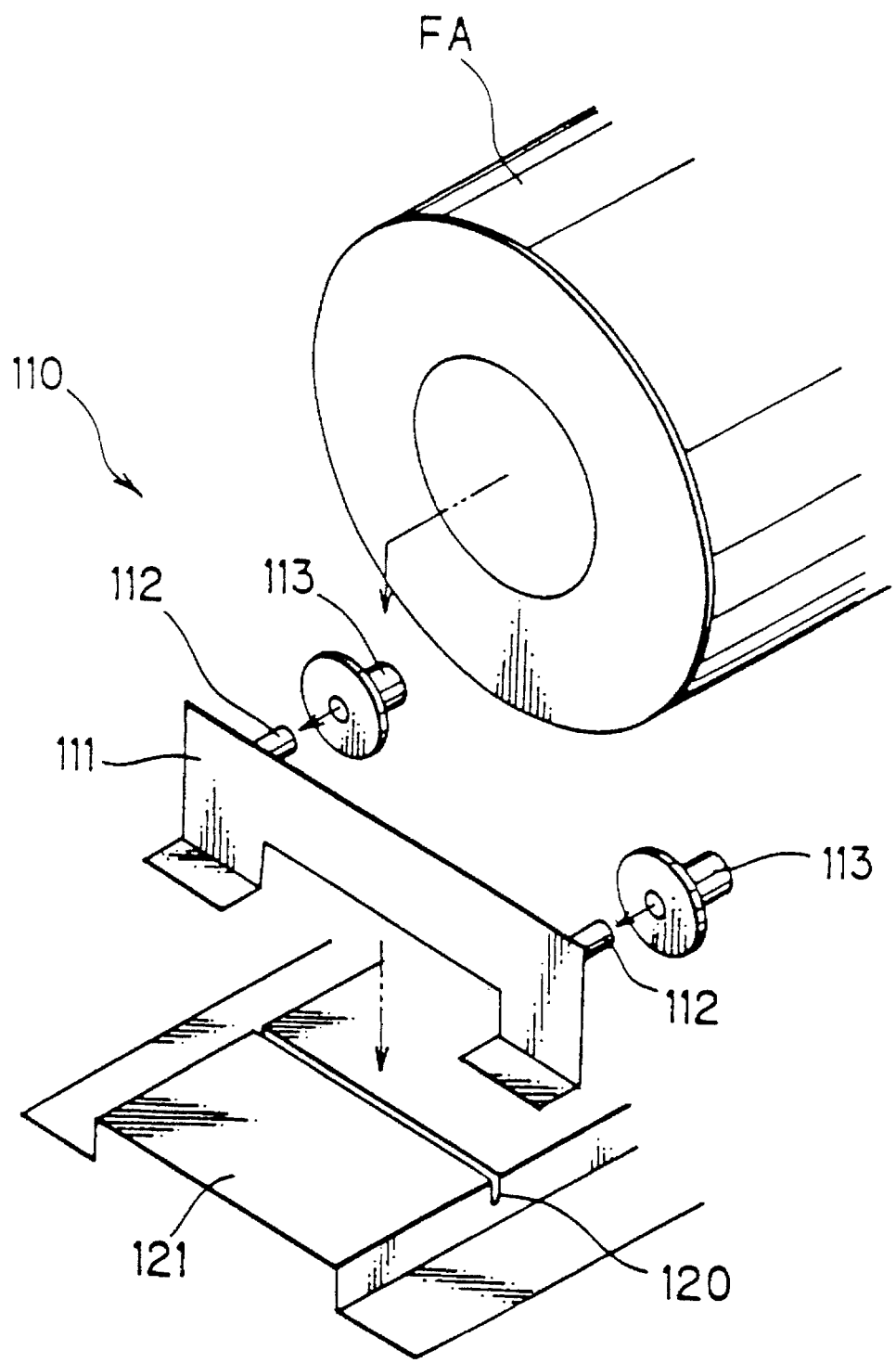
FIG. 6 is an exploded perspective view of a film support unit.

FIG. 6 is an exploded perspective view of the film support unit 110. In FIG. 6, the film support unit 110 includes a support plate 111. Two pins and 112 project transversely from support plate 111, project to be received in bearing apparatus of support rollers 113 and 113. With its film support plate 111 inserted into one of the positioning slits 120 of the positioning plate 121, the film support unit 110 is registered to a predetermined position. The other film support unit 110 is fixed to the bottom cover 101 (FIG. 5) by securing the film support plate 111 to the bottom cover 101.

With reference again to FIG. 5, the structure of the supply magazine 100A will be described. The roller RA attached to the top cover 103 is linked to a gear 130 through which the roller RA receives driving force of a pulse motor PM1 (described later) so that driving rotation force to the gear 130 rotates the roller RA, and accordingly, the contacting roller RA'. Hence, by driving the pulse motor PM1 while the photosensitive film FA is between the rollers RA and RA', the photosensitive film FA is drawn out of or rewound into the supply magazine 100A.

For ease of transportation of the supply magazine 100A, a grip 140 is attached to each side of the bottom cover 101. The supply magazine 100A is also provided on each side at top portion with a lock mechanism 150 (FIG. 7) in order to prevent the top cover 103 from opening during image recording or during transportation of the supply magazine 100A.

Figure 7:
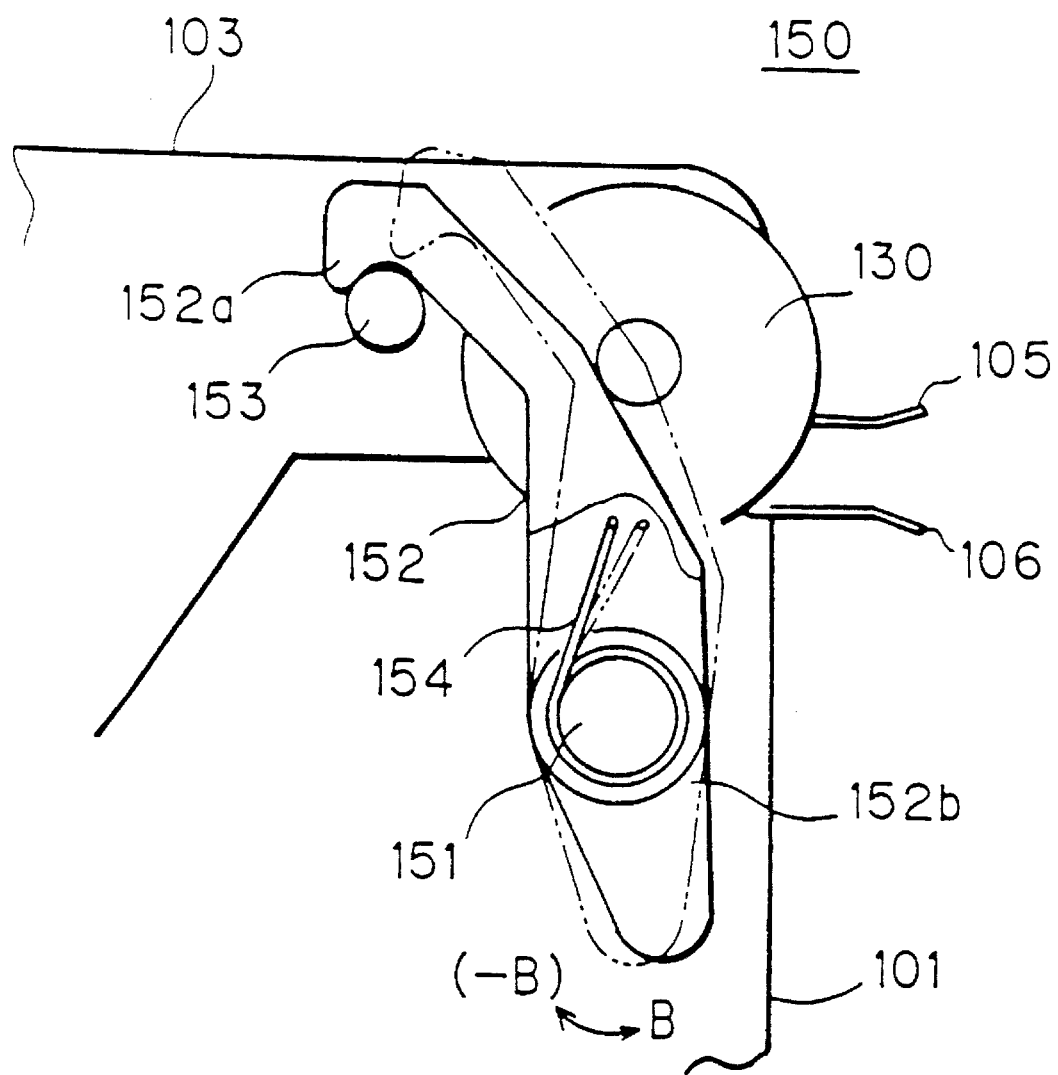
FIG. 7 is a side view of a lock mechanism.

FIG. 7 is a side view of the lock mechanism 150. The lock mechanism 150 includes a hook 152, which is pivotally mounted to the bottom cover 101 about a shaft 151, and a bar 153 which protrudes from the top cover 103. One end portion 152a of the hook 152 is shaped so as to be engageable with the bar 153. The other end portion 152b of the hook 152 is biased in the direction of the arrow B by a spring 154. Hence, when the top and the bottom covers 103 and 101 are engaged with each other into one unit, the hook 152 biased by the spring 154 pivots in the direction B and hooks with the bar 153 at its end portion 152a, whereby the top and the bottom covers 103 and 101 lock in engagement. On the other hand, when swung in the direction −B against the biasing force of the spring 154 as shown by the double dot line in FIG. 7, the hook 152 is unlocked to make it possible to open the top cover 103.

Figure 8:
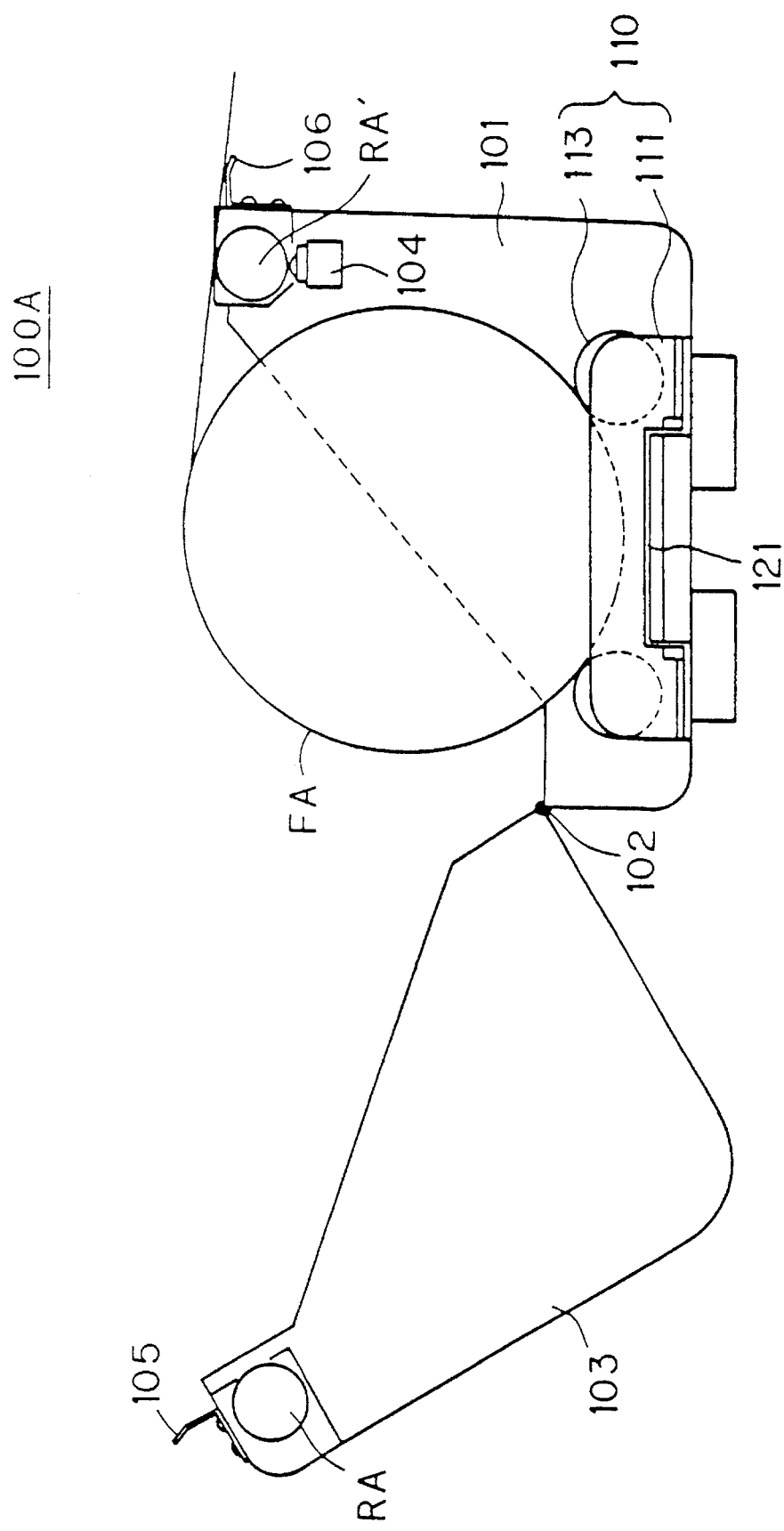
FIG. 8 is a simplified sectional view of a supply magazine shown in FIG. 4 with its top cover open.

FIG. 8 is a schematic cross sectional view of the supply magazine 100A with the top cover 103 opened. In the present embodiment, while the photosensitive film FA is taken out of and set in the supply magazine 100A, the top cover 103 remains open. For instance, setting of the photosensitive film FA in the supply magazine 100A is accomplished by an operator in the following manner. First, the film support unit 110 is inserted into one of the positioning slits 120 in accordance with the width of the photosensitive film FA as described above, and the both side margins of the photosensitive film FA are placed on the support rollers 113 and 113. Next, the leading end portion of the photosensitive film FA is placed on the roller RA' and the bottom guide plate 106. The top cover 103 is then swung closed about the hinge 102 into engagement with the bottom cover 101. Thus, the photosensitive film FA is placed in tight intimate contact area between the rollers RA and RA' in readiness for transportation, thereby completing the film setting.

On the other hand, taking out of the photosensitive film FA from the supply magazine 100A requires the following. First, the rollers RA and RA' are reversely rotated so that the photosensitive film FA is rewound into the supply magazine 100A. Next, the hook 152 is manually moved in the direction −B and unhooked, with a consequence that the top cover 103 automatically swing opens due to biasing force of the spring 154 (FIG. 8). The photosensitive film FA is then taken out of the bottom cover 101 through the opening.

As described above, the supply magazine 100A according to the preferred embodiment of the invention is designed for case of setting and taking out the photosensitive film FA. In addition, since the film support unit 110 is registered at different positions depending on the width of the photosensitive film FA, it is easy to exchange the photosensitive film FA with a further photosensitive film FA of a different size.

The supply magazine 100B is identical in structure to the supply magazine 100A. Hence, the effects listed immediately above are also promised in the supply magazine 100B.

B-2. TRANSPORT SECTION 200

As shown in FIG. 3, the transport section 200 contains a draw mechanism 210, a cutter mechanism 220 and a supply mechanism 230. The draw mechanism 210 draws a photosensitive film out of the supply section 100. The cutter mechanism 220 cuts the photosensitive film FA (or FB) into the film sheets F of a predetermined length (e.g., a length L). The supply mechanism 230 is in charge of transportation of the film sheets F into the image recording section 300. As mentioned before, the transport section 200 is also provided with the pulse motor PM1 for supply of driving power thereto.

The draw mechanism 210 includes a gear 211 which is intermeshed with the gear 130 of the supply magazine 100A so as to transmit driving rotation force of the pulse motor PM1 to the roller RA. This is also true of the supply magazine 100B: A gear 212 is provided which drives a roller RB of the supply magazine 100B in a similar manner. The gears 211 and 212 are linked to clutches MCL1 and MCL2, respectively. The draw mechanism 210 also includes rollers R1 and R1 for feeding the photosensitive film FA (or FB) from the supply magazine 100A (or 100B) to the cutter mechanism 220.

Figure 9:
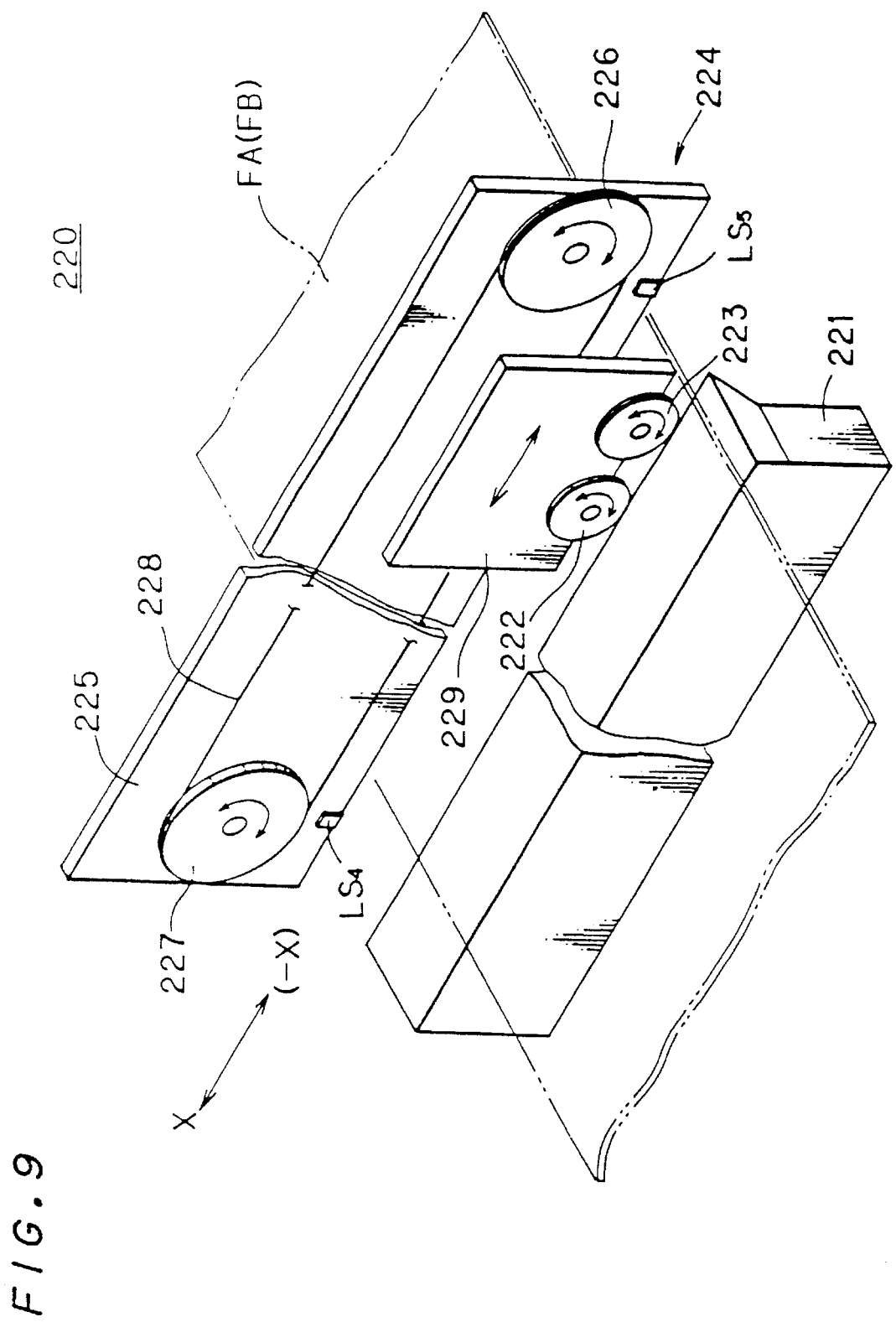
FIG. 9 is a perspective of a cutter mechanism.

FIG. 9 is a perspective view of the cutter mechanism 220. The cutter mechanism 220 includes a stationary cutter 221 which is fixed at a preselected position, movable cutters 222 and 223 which slide and/or rotate along the blade edge of the stationary cutter 221 to thereby form a cut on the photosensitive film FA (or FB), and a cutter drive mechanism 224 which drives the movable cutters 222 and 223. In the cutter drive mechanism 224, pulleys 226 and 227 are mounted to a plate 225 for free rotation, and a wire 228 runs about the pulleys 226 and 227. The wire 228 is linked to a cutter hold plate 229 which carries the movable cutters 222 and 223 for free cutter rotation. Driving force for driving the movable cutters 222 and 223 is generated by a motor M2 (FIG. 3) which has its rotation shaft linked to the pulley 226. Hence, when the motor M2 is activated, the plate 229 and the movable cutters 222 and 223 traverse the photosensitive film FA (or FB) as one unit in the direction X (or −X) along the width of photosensitive film.

As described above, two movable cutters are provided in the cutter mechanism 220. Describing the movable cutters 222 and 223 more precisely, one of the movable cutters is slightly inclined towards and the other one is slightly inclined backwards with respect to the longitudinal direction of the stationary cutter 221. The photosensitive film is severed sharply by using one of the cutters thus slightly inclined differently from each other in accordance with the cutting direction. That is, the movable cutter 222 cuts the photosensitive film FA (or FB) when the plate 229 slides in the direction X and the movable cutter 223 cuts the photosensitive film FA (or FB) when the plate 229 slides in the direction −X. This is the reason for providing the two movable cutters.

The supply mechanism 230 includes two roller sets R2 and R3 which receive driving rotation force of the pulse motor PM1 (See FIG. 3). A clutch MCL3 is attached to the rollers R2 and R2. The clutch MCL3 allows or otherwise blocks further transfer of drive force from the rollers R2 and R2 to the rollers R1 and R1.

Table 1 below shows how the clutches MCL1 to MCL3 regulate transfer of the driving force of the pulse motor PM1 when they are turned on and off.

TABLE 1

|  | MODE 1 | MODE 2 | MODE 3 | MODE 4 |
| --- | --- | --- | --- | --- |
| MCL1 | OFF | OFF | ON | OFF |
| MCL2 | OFF | OFF | OFF | ON |
| MCL3 | OFF | ON | ON | ON |
| RA | STOP | STOP | ROTATE | STOP |
| RB | STOP | STOP | STOP | ROTATE |
| R1 | STOP | ROTATE | ROTATE | ROTATE |
| R2 | ROTATE | ROTATE | ROTATE | ROTATE |
| R3 | ROTATE | ROTATE | ROTATE | ROTATE |

In Table 1, "ON" indicates that the motor driving force is being transferred due to actions of the clutches, whereas "OFF" indicates that transfer of the motor driving force is prohibited due to actions of the clutches.

As understood from Table 1, four drive force transfer modes are invoked by turning on and off the clutches MCL1 to MCL3.

(1) MODE 1

When all the clutches MCL1 to MCL3 are not effective, the driving force of the pulse motor PM1 is transmitted only to the roller sets R2 and R3 but prohibited to the other rollers RA, RB and R1. Hence, the pulse motor PM1 rotates only the roller sets R2 and R3, thereby feeding the separated film sheet F separated from the photosensitive film FA (or FB) to the image recording section 300. Since the rollers RA, RB and R1 are not in rotation, the photosensitive film FA (or FB) will not be supplied to the cutter mechanism 220.

(2) MODE 2

The clutch MCL3 turns on and allows the driving force of the pulse motor PM1 which has been transmitted to the rollers R2 further to the rollers R1 and R1.

(3) MODE 3

In addition to MODE 2, the clutch MCL1 turns on. This permits the gears 211 and 130 to transmit the motor driving force which has been transferred to the rollers R1 and R1 to the roller RA. As a result, the photosensitive film FA is pulled out of the supply magazine 100A towards the cutter mechanism 220.

(4) MODE 4

In addition to MODE 2, the clutch MCL2 turns on instead of the clutch MCL1 as in the case of MODE 3, and the gears 212 and 130 transmit the driving force of the rollers R1 and R1 to the roller RB, thereby drawing the photosensitive film FB out of the supply magazine 100B towards the cutter mechanism 220.

B-3. IMAGE RECORDING SECTION 300

Figure 10:
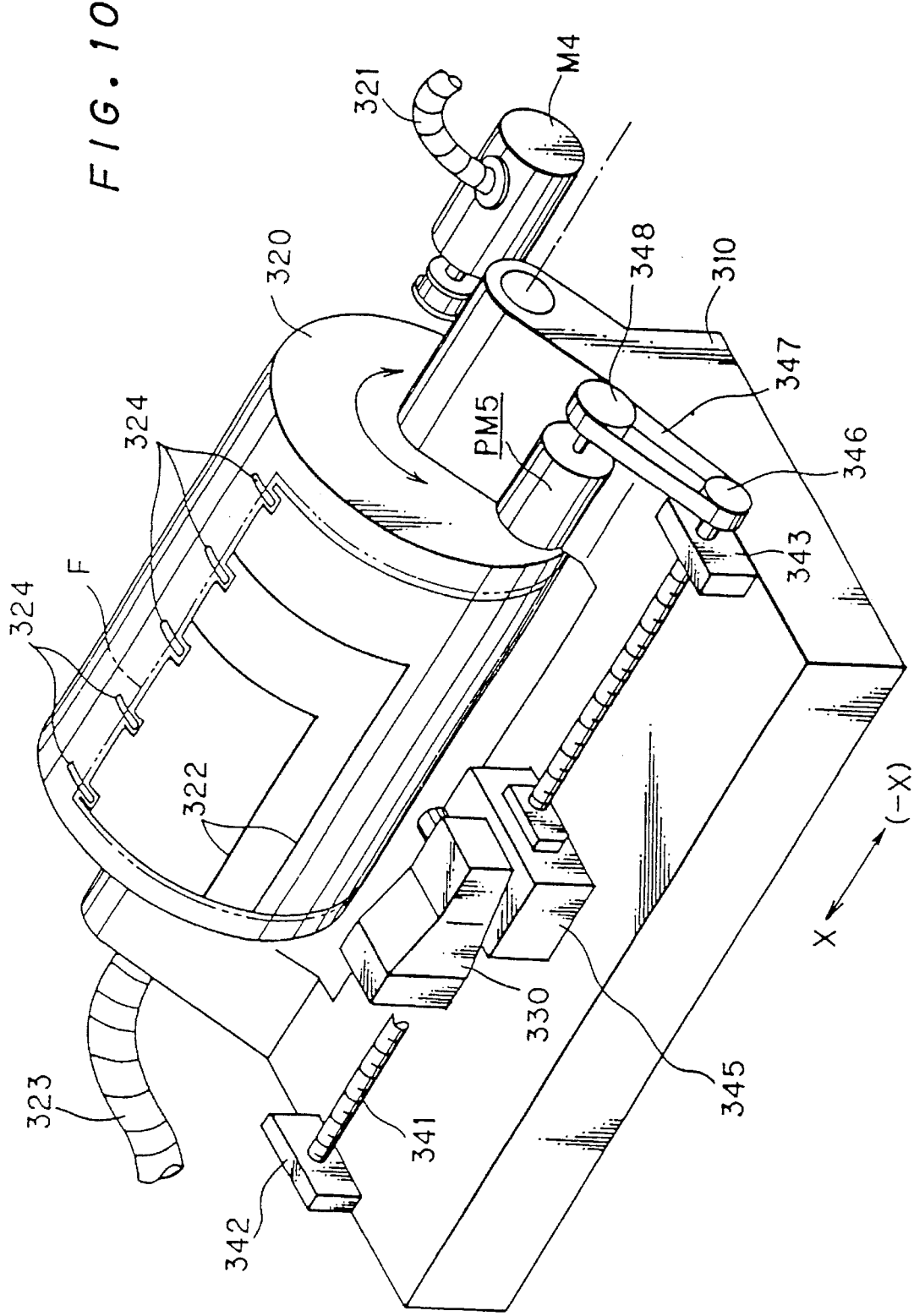
FIG. 10 is a perspective of the image recording unit of the image recording apparatus of FIG. 1.

FIG. 10 is a perspective view of the image recording section 300. In the image recording section 300, the recording drum 320 is rotatably supported by the frame 310. The recording drum 320, linked to the rotation shaft of a motor M4, rotates when driven by the motor M4. A duct 321 attached to the motor M4 is connected to a cooling fan (not shown) so that the motor M4 is cooled by a jet of cold air from the cooling fan.

A plurality of slits 322 are formed on the surface of the recording drum 320. The slits 322 are each connected to a blower (not shown) through the duct 323. For example, by placing a film sheet F on the recording drum 320 and activating the blower, the film sheet F is sucked onto the recording drum 320. The recording drum 320 is also provided with a plurality of small recesses 324 which are formed on the drum surface. The recesses 324 are arranged on a straight line parallel to the rotation shaft of the recording drum 320. The function of the recesses 324 will be described in detail later.

In FIG. 10, the ball screw 341 is mounted, parallel to the rotation shaft of the recording drum 320, for free rotation on the frame 310. The ball screw 341 is axially supported at both end portions in support members 342 and 343. A stage 345 mounting the exposure head 330 is threadedly mounted centrally on the ball screw 341 which carries a pulley 346 at one end. A belt 347 is stretched about the pulley 346 and another pulley 348 which is mounted to the rotation shaft of a pulse motor PM5. Hence, when the pulse motor PM5 is driven, the exposure head 330 slides a distance which corresponds to rotations of the pulse motor PM5, parallel to the rotation shaft of the recording drum 320 (i.e., in the directions X or −X).

B-4. DISCHARGE SECTION 400

Next, the structure of the discharge section 400 will be described with reference to FIG. 3. In the discharge section 400, a nip roller R4 is disposed in opposing relation to and selectively disengageable from the recording drum 320. That is, the nip roller R4 is spaced from the recording drum 320 when a solenoid SL1 connected therewith is not activated as shown by the solid line in FIG. 3. When the solenoid SL1 is actuated, the nip roller R4 is urged against the recording drum 320 (See the double dot line). The strip nail 410 is disposed adjacent to the nip roller R4. The strip nail 410 is also selectively disengageable from the recording drum 320 and is connected to a solenoid SL2 for operation thereby.

Figure 11:
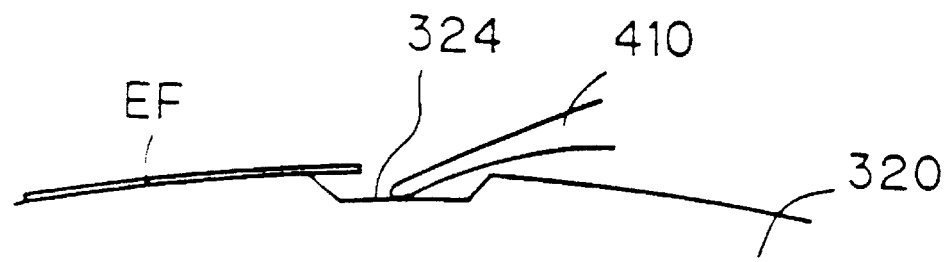
FIGS. 11 and 12 are schematic views illustrating the stripping action of a stripper nail.
Figure 12:
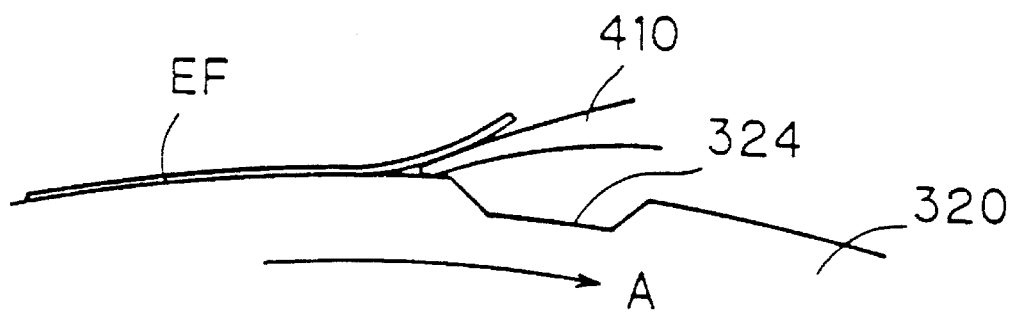

FIGS. 11 and 12 are schematic illustrations showing stripping action of the strip nail 410. The tip of the strip nail 410 is urged against the recording drum 320 while the solenoid SL2 is enabled and is separated from the recording drum 320 while the solenoid SL2 is disabled. When the recording drum 320 is in at a certain position, the tip of the strip nail 410 enters with the recesses 324 which are formed on the recording drum 320 (FIG. 11). As the recording drum 320 rotates in the direction of the arrow A, the strip nail 410 strips recorded film sheets EF one after another from the recording drum 320 (FIG. 12).

Immediately above the strip nail 410, a change-over member 420 is disposed which operates in cooperation with the strip nail 410. The change-over member 420, in combined operation with the discharge mechanism 430, controls a discharge path for the recorded film sheets EF as described below. How the recorded film sheets EF are discharged will also be described in detail later.

The location of the discharge mechanism 430 is midway between the change-over member 420 and the temporary storing magazine 500. One function of the discharge mechanism 430 is to receive the recorded film sheets EF which have been propelled past the strip nail 410 and the change-over member 420 and to feed the recorded film sheets EF into the temporary storing magazine 500. Another function of the discharge mechanism 430 is to receive the recorded film sheets EF drawn out of the temporary storing magazine 500 and to advance the recorded film sheets EF towards the change-over member 420. Two roller sets R5 and R6 are mounted in the discharge mechanism 430. The rollers R5 and R6 are bi-directional rollers that are linked to a variable speed motor M3. Through the action of rollers R5 and R6, the discharge mechanism 430 sends the recorded film sheets EF into and out of the temporary storing magazine 500 at any desired feeding speed.

B-5. Temporary storing magazine 500

Figure 13A:
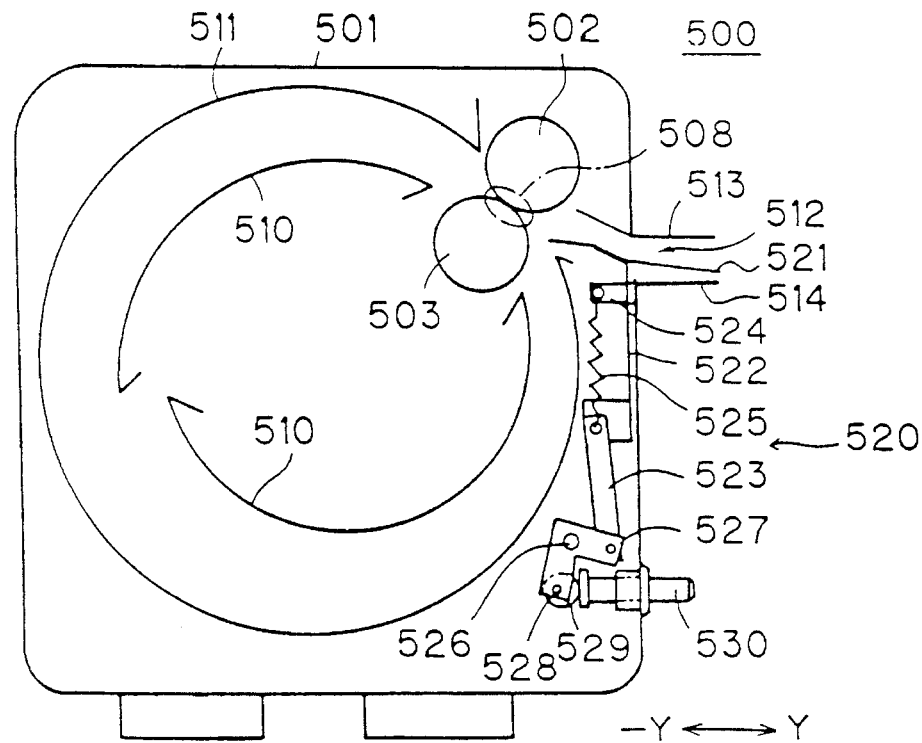
FIGS. 13A and 13B are simplified cross-sections of an output magazine.
Figure 13B:
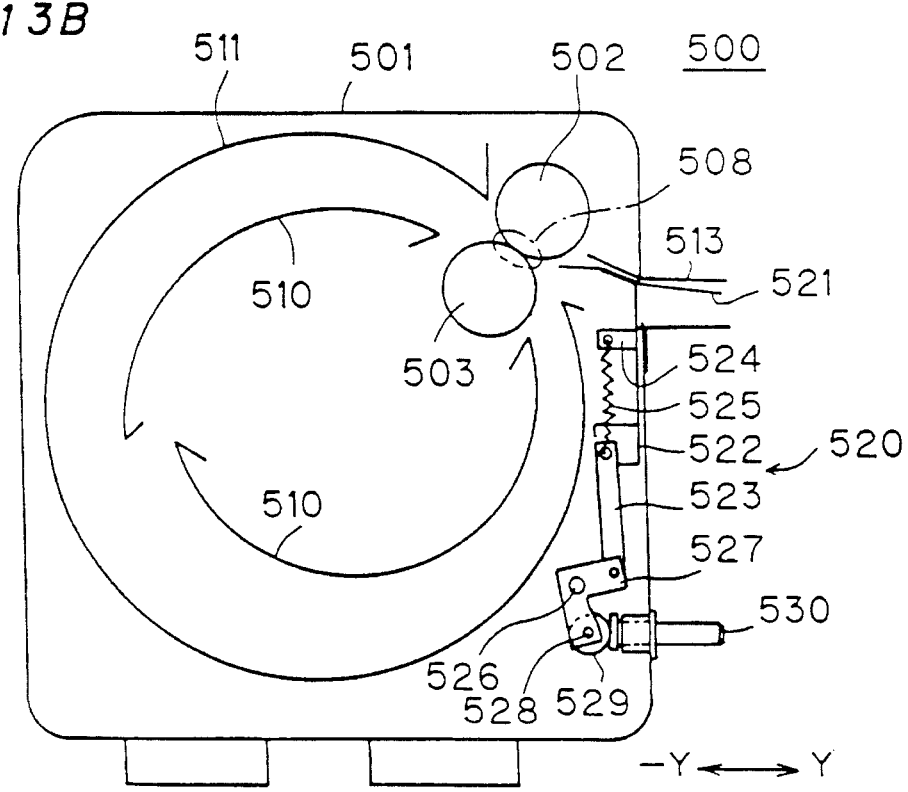
Figure 14:
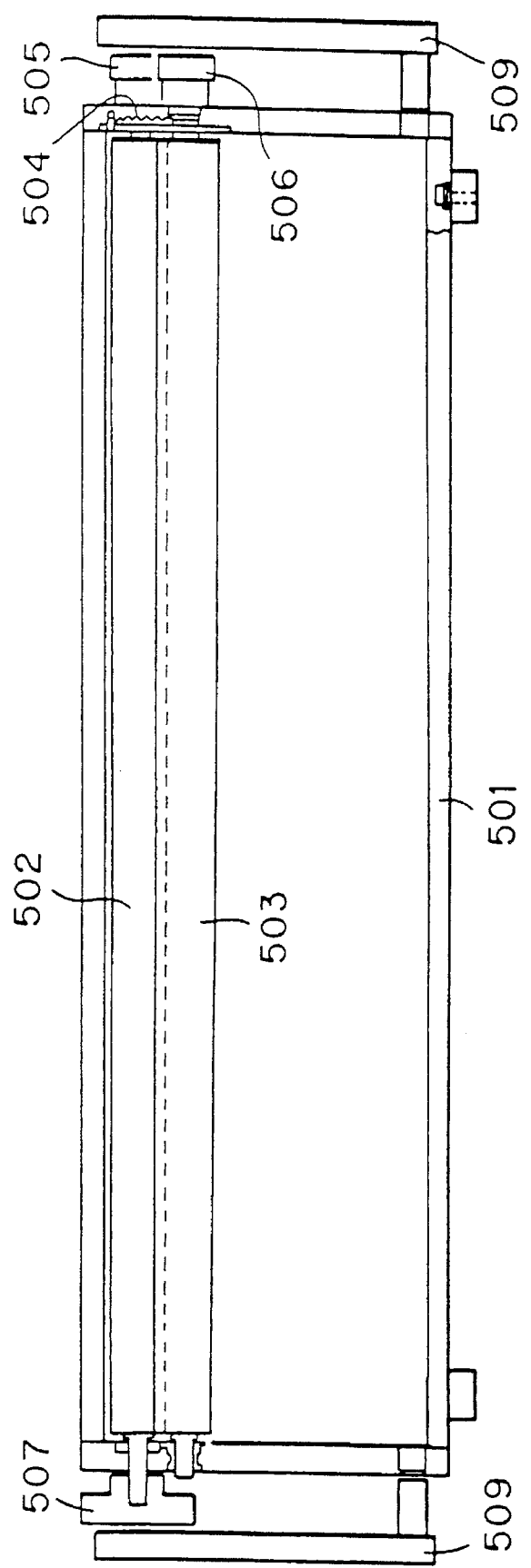
FIG. 14 is a simplified view of the output magazine of FIGS. 13A and 13B looking at right angles to the views of FIGS. 13A and 13B.

FIGS. 13A, 13B and 14 are cross sectional views of the temporary storing magazine 500. The temporary storing magazine 500 includes a cover 501 to which paired nip rollers 502 and 503 are rotatably mounted. In FIG. 14, the lower nip roller 503 is linked to a spring 504 and hence based against the upper roller 502. The nip roller 502 is linked to a gear 505 at one end (rightmost end in FIG. 14). Hence, when set to the image recording apparatus (FIG. 1), the temporary storing magazine 500 enables that the gear 505 receive the driving rotation force of the motor M3 of the discharge section 400. In this regard, the gear 505 serves as a drive mechanism for driving the nip roller 502. On the other hand, the nip roller 503 is linked at one end to a gear 506 which is toothed for driving engagement with the gear 505. Linked to the gear 506, the nip roller 503 rotates as the nip roller 502 rotates. By passing a film sheet EF through the pressure nip of the nip rollers 502 and 503 which are in rotation, the film sheet EF is conveyed into or discharged out of the temporary storing magazine 500.

The nip roller 502 is provided with a knob 507 at the other end (leftmost end in FIG. 14). Transfer of the recorded film sheet EF into and out of the temporary storing magazine 500 is also made possible by manually rotating the knob 507 and thereby rotating the nip rollers 502 and 503. Thus, according to the preferred embodiment of the present invention, the recorded film sheet EF is fed into and out of the temporary storing magazine 500 under the control of the motor M3 or otherwise by manual operation.

In FIG. 14, indicated at reference numeral 509 is a handle which is attached to the temporary storing magazine 500 for convenience in setting the temporary storing magazine 500 to the image recording apparatus and in conveying the temporary storing magazine 500.

As shown in FIGS. 13A and 13B, an inner loop guide 510 and an outer loop guide 511 are installed in the cover 501. The loop guides 510 and 511 form an endless film path therebetween which runs on the contact area of the nip rollers 502 and 503. A slit 512 is opened in the cover 501, and upper and lower guides 513 and 514 are fixed at the slit 512 so that a gateway for conveying the recorded film sheet EF is ensured. When the nip rollers 502 and 503 are rotated in a manner as described immediately above, the recorded film sheet EF is fed through the area between the upper and the lower guides 513 and 514, or through the slit 512, and wound up along the endless film path. Although the endless film path has been described as defined by the inner and the outer guides 510 and 511, the inner guide 510 is not an essential structural member (The outer guide 511 is an essential structural member).

Figure 15A:
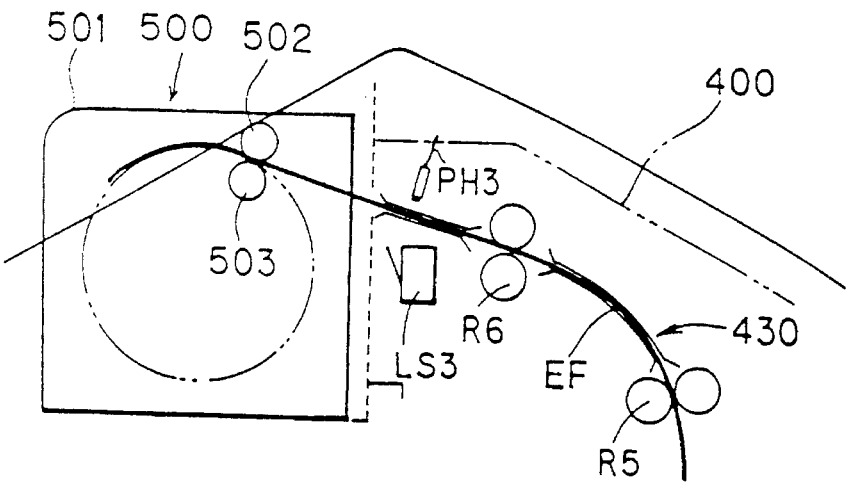
FIGS. 15A to 15C are schematics showing discharging action within the output magazine.
Figure 15B:
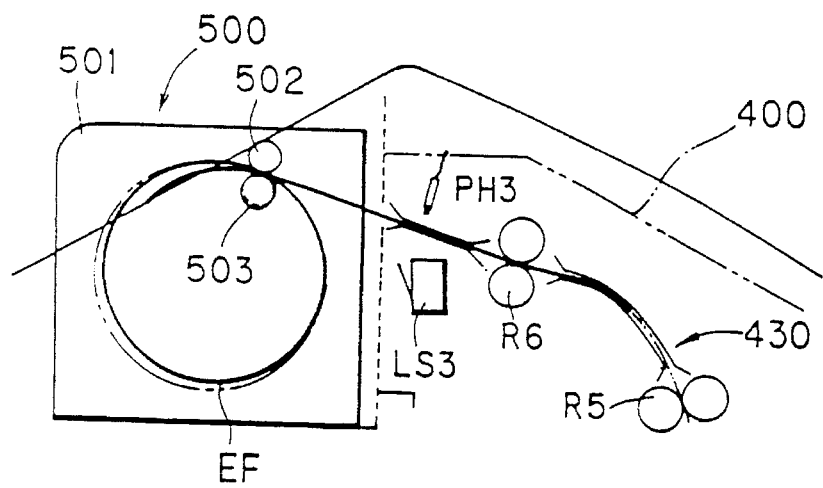
Figure 15C:
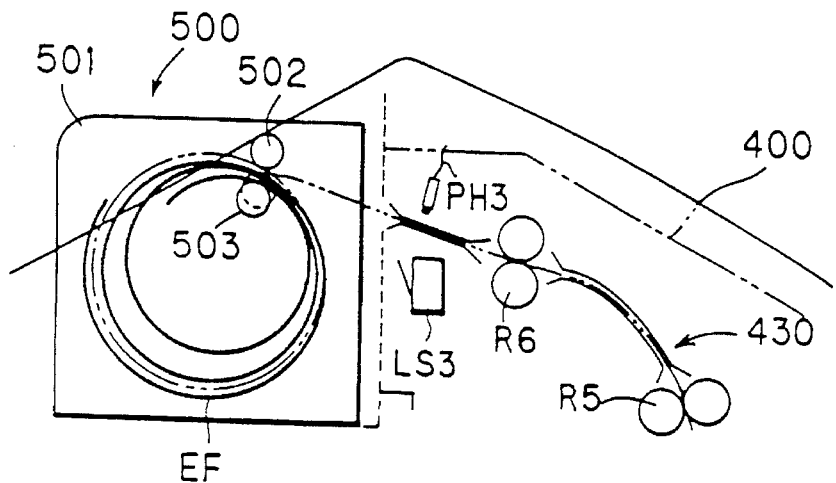

FIGS. 15A to 15C are schematic illustrations showing temporary discharging action within the temporary storing magazine 500. At initial stage of film transfer into the temporary storing magazine 500 from the discharge section 400, the leading margin of a recorded film sheet EF, as can be seen in FIG. 15A, passes between the nip rollers 502 and 503 and advances the endless film path along the inner wall of the outer guide 511 (the double dot line of the drawing). As further wound up into the temporary storing magazine 500, a loop of the recorded film sheet EF is formed and its leading margin again enters and passes through the pressure nip of the nip rollers 502 and 503 (FIG. 15B). This is repeated until the rear margin of the recorded film sheet EF finally enters the nip of the nip rollers 502 and 503 as shown in FIG. 15C. On the other hand, if the nip rollers 502 and 503 are reversely rotated, the recorded film sheet EF is drawn out of the temporary storing magazine 500 in the reverse sequence of the winding up. In the temporary storing magazine 500 thus constructed, as the leading margin of the recorded film sheet EF repeatedly passes through the pressure nip of the nip rollers 502 and 503 while forming loops, the nip roller 503 moves towards the center of the endless film path against the biasing force of the spring 504. Hence, the outermost surface of the film sheet EF in the form of a roll always stays in contact with the stationary nip roller 502 regardless of the film length, which in turn makes it possible that the recorded film sheet EF is guided without fail into the slit 512 on its way from the temporary storing magazine 500 to outside.

The temporary storing magazine 500 comprises a shutter mechanism 520 which prevents unwanted exposure of the film sheet EF in the temporary storing magazine 500. The shutter means includes a light shield plate 521 which is disposed for free up-down movement between the upper and the lower guides 513 and 514. From the center portion of the light shield plate 521, a plate 522 extends downwards in linkage to one end of a link plate 523. The linkage joint of the plate 522 and the link plate 523 is spring-connected by a spring 525 to a plate 524 which is fixed to the cover 501 in the vicinity of the lower guide 514, whereby the plate 522 is biased upwards. The link plate 523 is linked at its other end to one end of a generally L-shaped plate 527 which is pivotally provided for swing movement about an axis 526. A roller 529 is mounted to the other end of the L-shaped plate 527 for free rotation about an axis 528. The roller 529 is in contact with a plug 530 which is inserted into the cover 501 at a lower portion. The plug 530 is slidable in directions Y and −Y without losing contact with the roller 529.

The shutter mechanism 520 is opened in the following manner. Pushed by the plug 530 moving in the direction −Y, the generally L-shaped plate 527 pivots about the axis 526 in a clockwise direction. This pulls the link plate 523 downwards against the biasing force of the spring 525, which in turn pulls the light shield plate 521 downwards. As a result, a film path for guiding the film sheet EF is created (FIG. 13A). This completes the opening action of the shutter mechanism 520.

If the plug 530 is released it moves in the direction Y, the spring 525 biases the light shield plate 521 upwards into contact with the upper guide 513 (FIG. 13B). Thus, the film path for guiding the film sheet EF is closed, or in other words, the shutter slide shuts. The image recording apparatus comprises in its cassette receiving portion a plug contact member which is located in operative position relative to the plug 530. Hence, when the temporary storing magazine 500 is inserted into the cassette receiving portion, the plug contact member contacts and pushes the plug 530 in the direction −Y, ensuring that the shutter remains open as long as the temporary storing magazine 500 stays set to the image recording apparatus. If the temporary storing magazine 500 is detached from the image recording apparatus, the plug 530 moves in the direction Y and the shutter slide shuts.

The shutter may be otherwise manually kept open through use of a stopper mechanism (not shown) which is mounted to the temporary storing magazine 500.

As heretofore described, the temporary storing magazine 500 according to the preferred embodiment of the invention retains the recorded film sheet EF always in the same state (more precisely, in the form of loops along the endless film path) despite its simple structure. In addition, since the recorded film sheet EF is completely collected into the temporary storing magazine 500 and thereafter the shutter mechanism 520 is immediately closed to prohibit any light into the slit 512, the film sheet EF will see no chance of getting inadvertently exposed at its rear margin. Further, the nip rollers 502 and 503 not only transfer of the film sheet EF into but also wind the film sheet EF within the temporary storing magazine 500, the need for providing a film reel is eliminated. Hence, the temporary storing magazine 500 is reduced in weight.

Although the foregoing has been described where only one recorded film sheet EF is wound up, the temporary storing magazine 500 can successively wind up a plurality of recorded film sheets EF. More particularly, a second film sheet EF is similarly wound up in the form of a loop in the temporary storing magazine 500 over a first film sheet EF which has been already wound up in the temporary storing magazine 500. On the other hand, in order to take the recorded film sheets EF thus wound up in loops out of the temporary storing magazine 500, the temporary storing magazine 500 is detached from the image recording apparatus. By rotating the knob 507, the recorded film sheets EF are pulled out of the temporary storing magazine 500 one after another. That is, since the recorded film sheets EF are retained in the form of loops along the endless film path and nipped by the nip rollers 502 and 503, when the nip rollers 502 and 503 rotate in the reverse direction, the recorded film sheets EF are expelled, as they are partially overlapped and hence successively as one sheet, in the reverse order of transfer into the temporary storing magazine 500.

C. ELECTRICAL STRUCTURE

Figure 16:
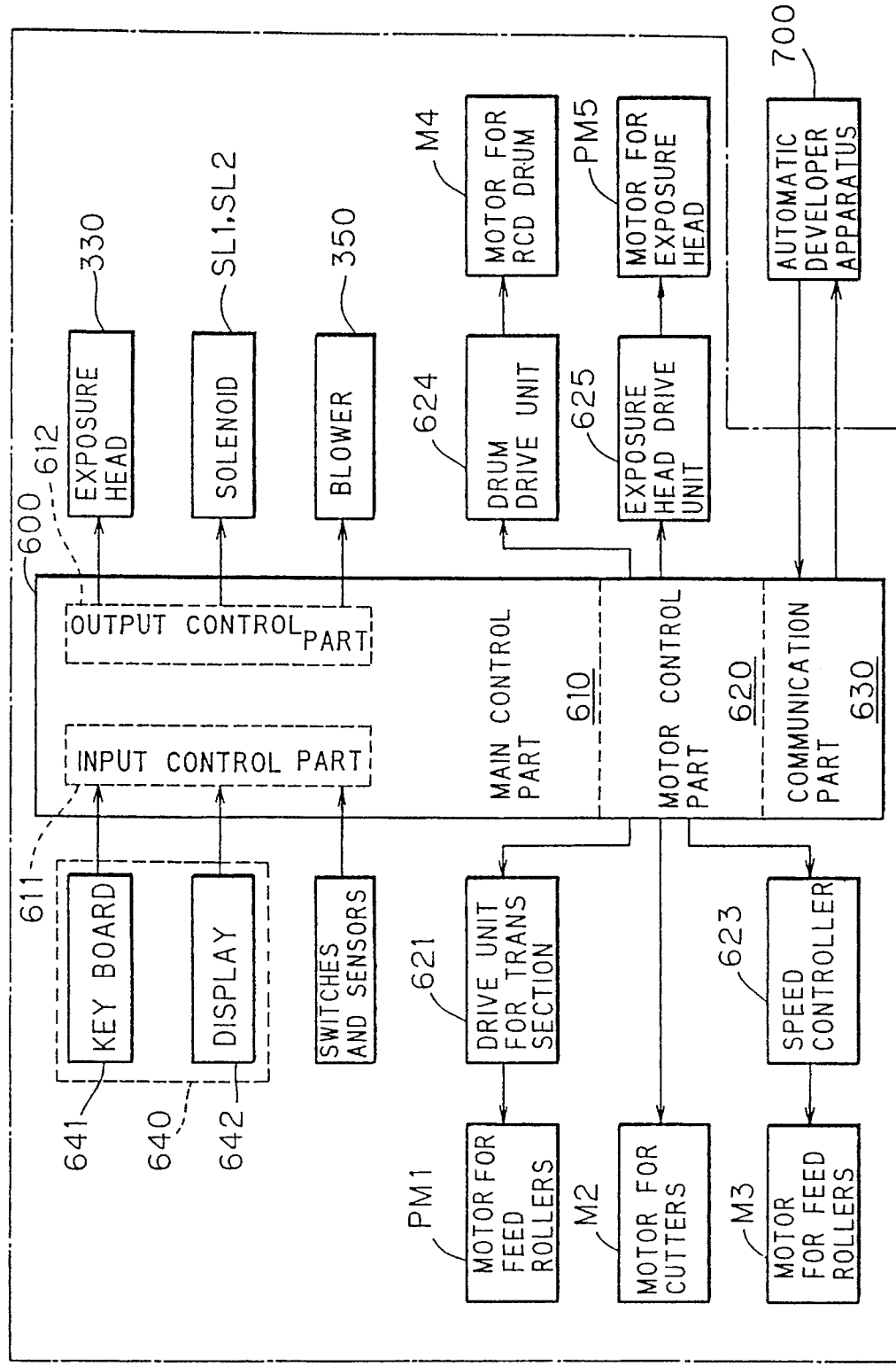
FIG. 16 is a block diagram of the control system of the image recording apparatus in FIG. 1.

FIG. 16 is a block diagram of a control system of the image recording apparatus of the present invention. A control section 600 is comprised of a main control part 610, a motor control part 620 and a communication part 630. The main control part 610 includes an input control part 611 and an output control part 612. The input control part 611 is coupled to the following parts:

(1) Operation panel 640

The operation panel 640 includes a keyboard 641 and a display 642. Data specifying a sequence of image recording are loaded via the operation panel 640.

(2) Limiter switches and sensors Limiter switches LS1, LS2, etc. and sensors PH1, PH2, etc. are operatively connected to the respective parts of the image recording apparatus to control feed of a photosensitive film and film sheets (See FIG. 3). What are detected by the limiter switches and the sensors are also given to the input control part 611. The limiter switches detect:

LS1: whether the supply magazine 100A is locked

LS2: whether the supply magazine 100B is locked

LS3: whether the temporary storing magazine 500 is set to the image recording apparatus LS4: the left end of the cutter LS5: the right end of the cutter LS6: the photosensitive film wound around the recording drum 320

LS10: whether the supply section 100 is set to the image recording apparatus

LS11: whether the transport section 200 is set to the image recording apparatus

LS12: whether the discharge section 400 is set to the image recording apparatus

LS13: whether the door is open or closed

PH1: the photosensitive film FA

PH2: the photosensitive film FB

PH3: the recorded film sheets EF

PH4: a position (1) of the leading margin of a film sheet on the recording drum 320

PH6: initial position of the nip roller R4

PH7: initial position of the strip nail 410

PH8: a position (2) of the leading margin of a film sheet on the recording drum 320

PH10—PH12: identification code of the supply magazine 100A

PH13—PH15: identification code of the supply magazine 100B

On the other hand, the output control part 612 is coupled to:

(1) Exposure head 330

The exposure head 330 turns on and off a laser beam and controls other associated elements in response to a control signal from the output control part of the main control part 610.

(2) Solenoids SL1 and SL2

The solenoid SL1 is an actuator for urging the nip roller R4 against the recording drum 320 and for separating the nip roller R4 from the recording drum 320. The solenoid SL2 is a drive source for simultaneously driving the strip nail 410 and the change-over member 420.

(3) Blower 350

The blower 350 is linked to the slits 322 of the recording drum 320 through the duct 323. The negative pressure to the slits 322 is adjusted under the control of the blower 350.

The motor control part 620 is coupled to:

(1) Motor PM1 for driving the feed rollers
(2) Motor M2 for driving the cutter
(3) Motor M3 for driving the discharge rollers
(4) Motor M4 for driving the recording drum
(5) Motor PM5 for driving the exposure head Control signals from the motor control part 620 are supplied to the motors PM1, M4 and PM5 through drive units 621, 624 and 625, respectively, to the motor M2 directly without any interposed element, and to the motor M3 through a speed controller 623.

The communication part 630 is connected to an automatic developing machine 700 which develops the recorded film sheets EF which are received by the image recording apparatus. Bi-directional communication is provided between the image recording apparatus and the automatic developing machine 700.

D. IMAGE RECORDING

Description will now be given of three different cases of image recordings for printing a desired image on film sheets of a predetermined size (width W and length L) or of a larger size. That is, the first case which uses only the photosensitive film FA which is stored in the supply magazine 100A, the second case which uses the photosensitive films FA and FB of the same width W which are stored in the supply magazines 100A and 100B, and the third case which uses the photosensitive films FA and FB of different widths WA and WB which are stored in the supply magazines 100A and 100B.

D-1. FIRST CASE

Figure 17:
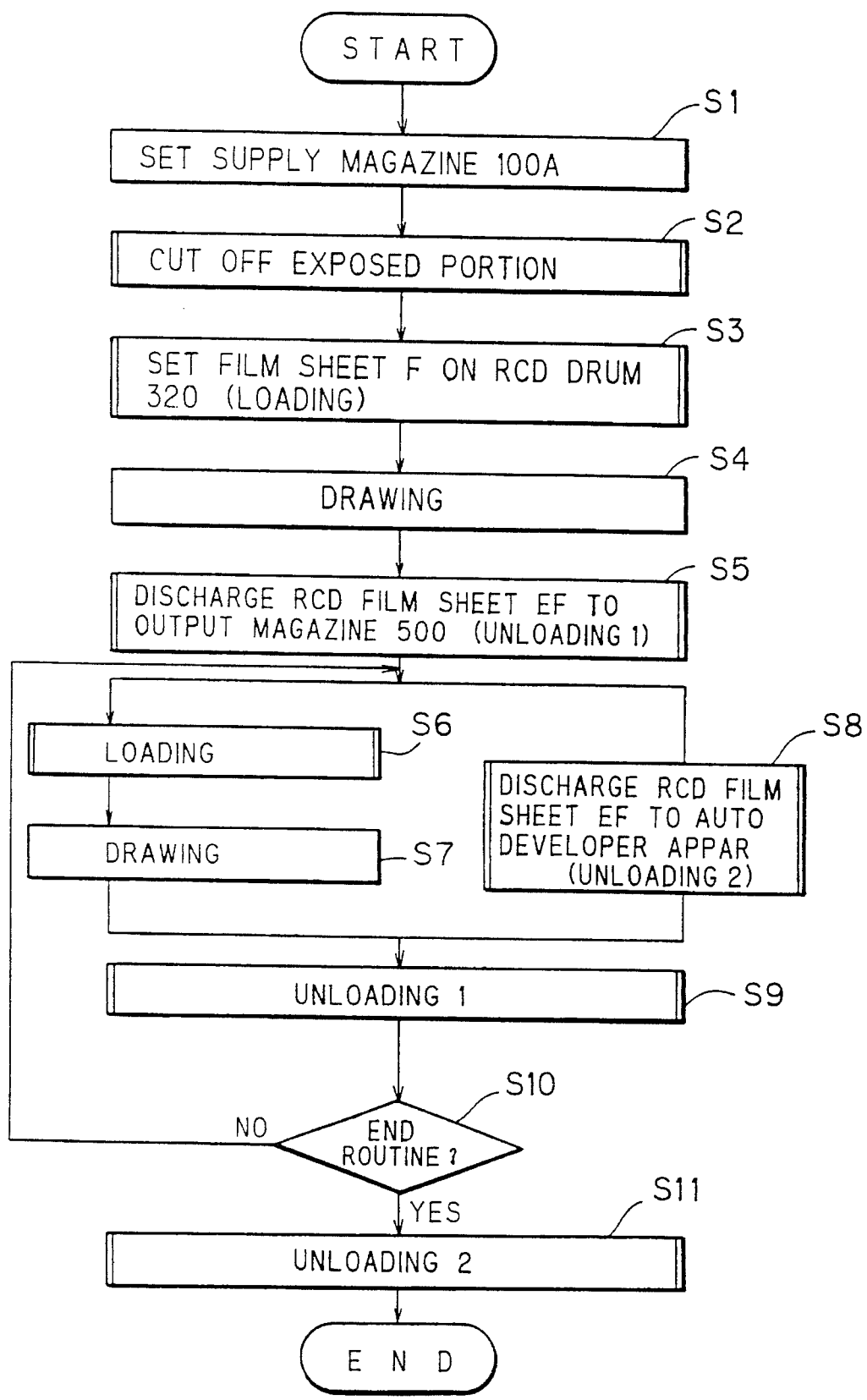
FIG. 17 is a flow chart showing the general sequence of events within the image recording apparatus of FIG. 1 for a first case of image recording.
Figure 18:
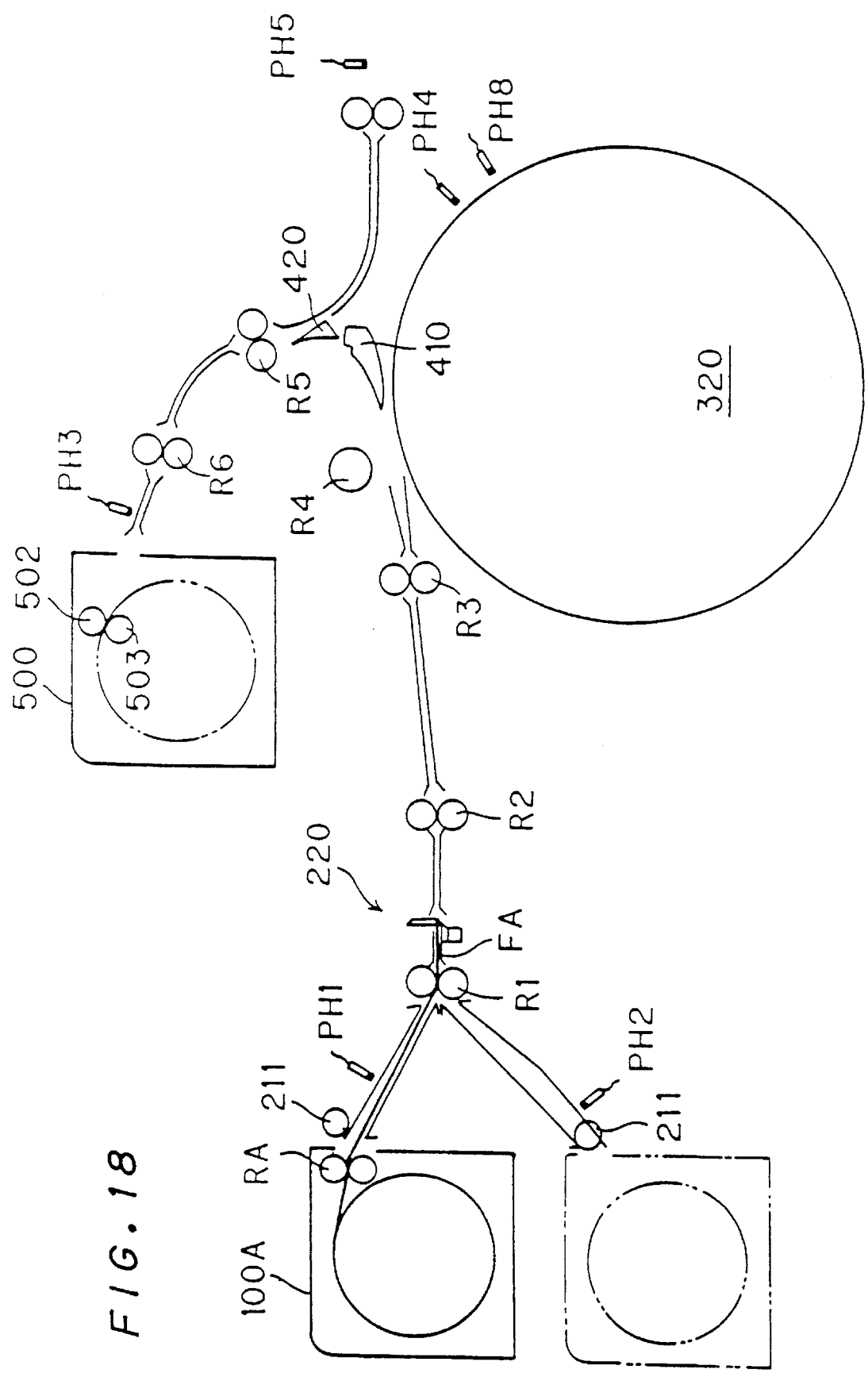
FIGS. 18 to 21 are schematic diagrams of the image recording apparatus of FIG. 1 during successive stages in the process of the first case of image recording.

FIG. 17 is a flow chart showing the general sequence of events in the image recording apparatus for the first case. FIGS. 18 to 21 are schematic diagrams illustrating the first case. The sequence of events in the image recording apparatus will be described with reference to these drawings, which will be immediately followed by detailed description of the individual operation steps.

First, referring to FIG. 17, the photosensitive film FA is placed in the supply magazine 100A and the supply magazine 100A is then set to the image recording apparatus (Step S1). Since it is impossible to prevent the leading margin of the photosensitive film FA from getting exposed during the setting, the exposed portion (leading end portion of the photosensitive film FA) is cut off in Step 2 (See FIG. 18).

Figure 19:
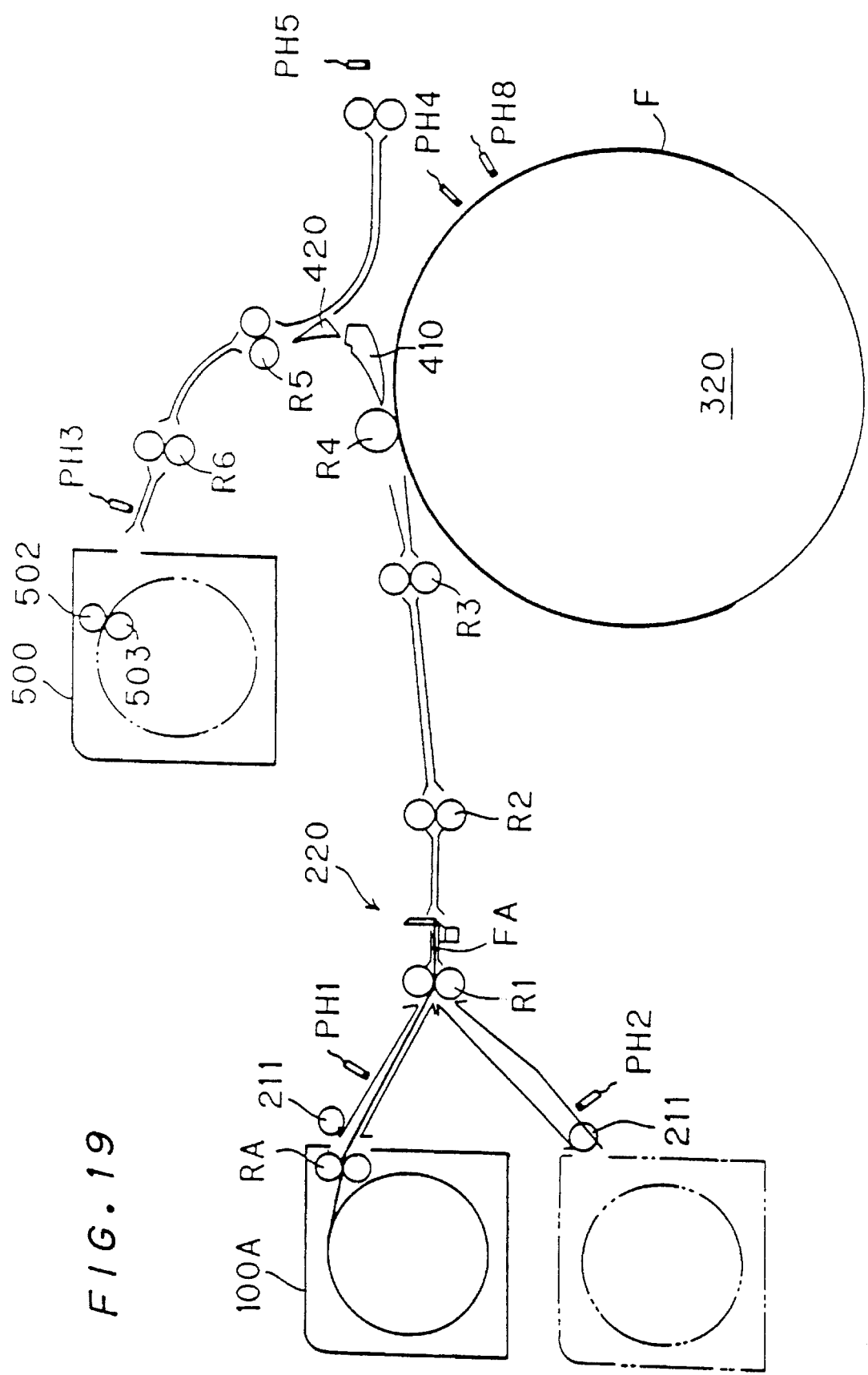

The photosensitive film FA is fed a predetermined length L towards the recording drum 320, and a film sheet F of the length L is cut from the photosensitive film FA in the cutter mechanism 220. The film sheet F is further fed and registered on the recording drum 320 at the predetermined registering position as shown in FIG. 19 (Step S3). The series of events up to this stage will be hereinafter referred to as "LOADING".

Next in Step S4, the recording drum 320 is rotated at a high speed, concurrently with which a laser beam is scanned from the exposure head 330 parallel to the rotation shaft of the recording drum 320 (approximately perpendicular to the plane of the drawing FIG. 19) onto the film sheet F, thereby recording an image on the film sheet F (DRAWING).

Figure 20:
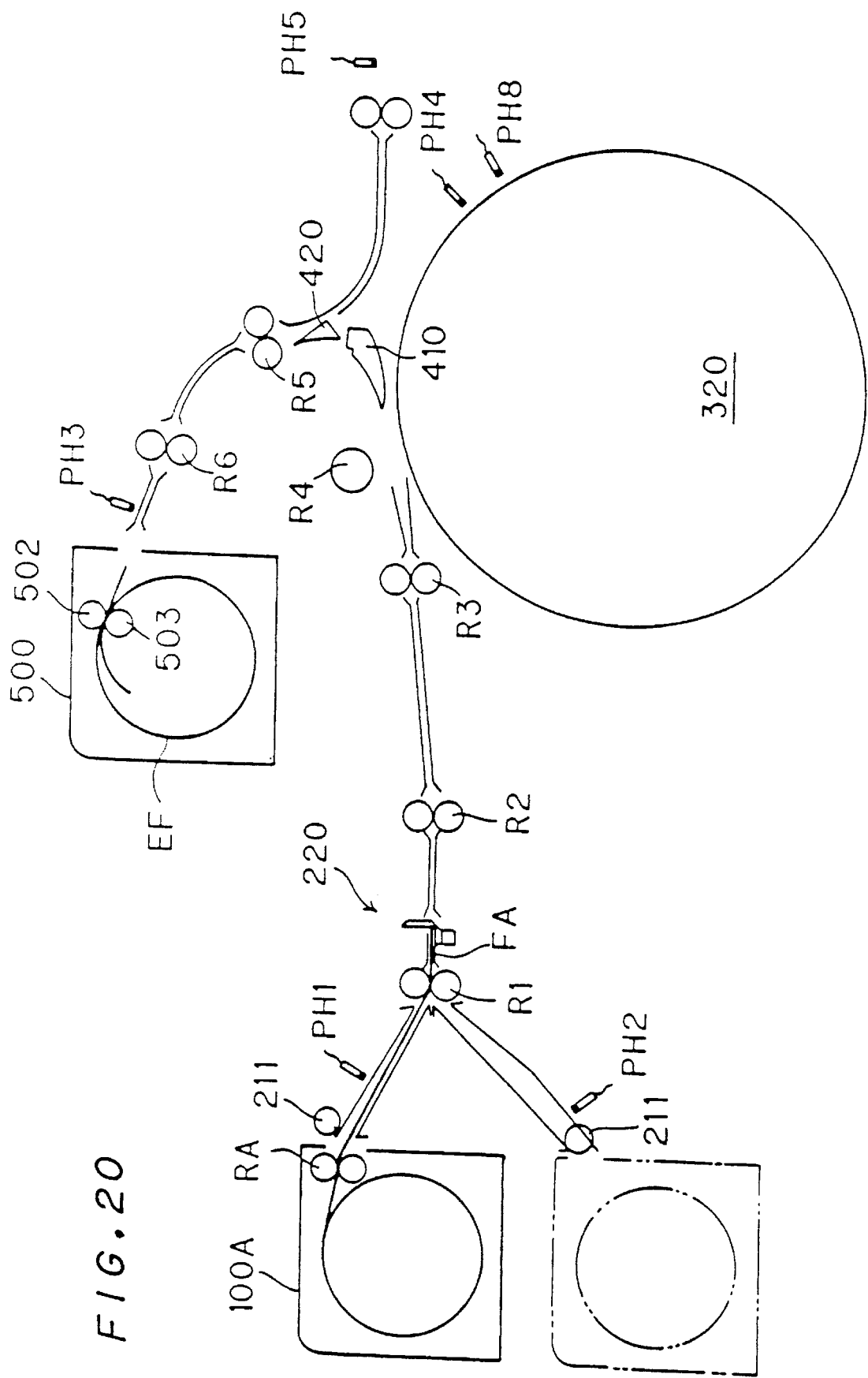
Figure 21:
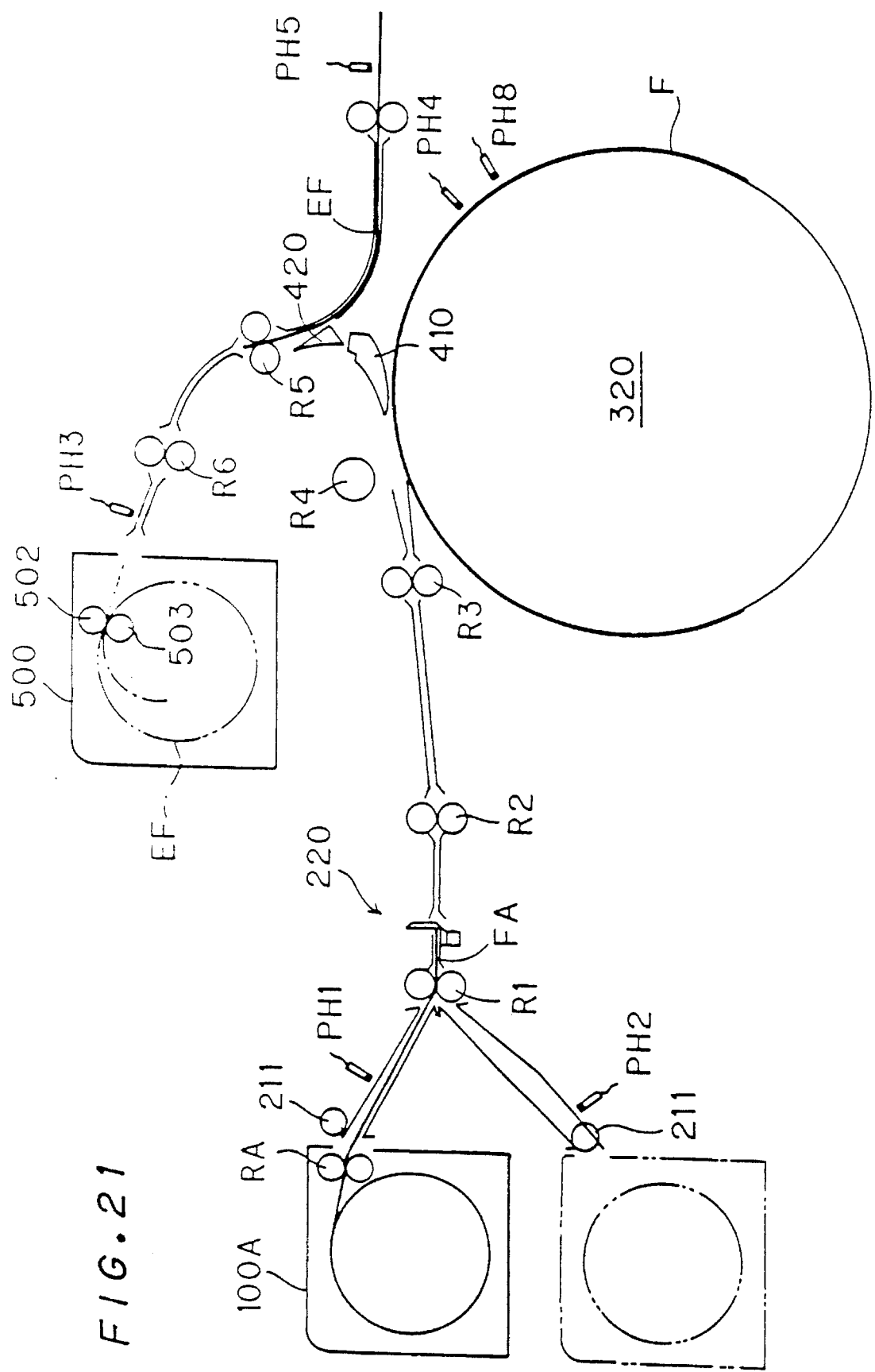

On completion of DRAWING, the recorded film sheet EF is stripped off the recording drum 320 by the strip nail 410 and discharged to the temporary storing magazine 500 for temporary rest thereat (Step S5, FIG. 20). For convenience of description, this will be hereinafter referred to as "UNLOADING 1."

The recorded film sheet EF is drawn out of the temporary storing magazine 500 towards the automatic developing machine 700 while next LOADING (Step S6) and subsequent DRAWING (Step S7) are executed uninterruptedly as shown in FIG. 17 (Step S8). More particularly, another film sheet F of the length L is severed from the photosensitive film FA and set onto the recording drum 320 at the predetermined registering position similarly to Steps S3 and S4 (FIG. 21), immediately followed by high speed rotation of the recording drum 320 and concurrent scanning of a laser beam from the exposure head 330 to record an image on the film sheet F. At the same time, the recorded film sheet EF is advanced into the automatic developing machine 700 which waits ready to operate, at a feeding speed which is coordinated with the speed of development in the automatic developing machine 700 (i.e., normally slower than the rotation speed of the recording drum 320 in LOADING). This will be hereinafter referred to as "UNLOADING 2" for clarity of description.

In Step S9, the recorded film sheet EF processed in the last DRAWING (Step S7) is discharged into the temporary storing magazine 500. Following this, whether DRAWING is to end is determined (Step S10). If it is judged to end DRAWING, the process proceeds to UNLOADING 2 (Step 11) wherein the recorded film sheets EF temporarily retained in the temporary storing magazine 500 are discharged into the automatic developing machine 700. On the other hand, if the judgement at Step S10 is "NO," i.e., continued image processing is necessary, Steps S6 to S9 are repeated without pause to thereby output the recorded film sheets EF each carrying the desired image to the automatic developing machine 700 until the judgement at Step S10 changes to "YES."

As described immediately above, the temporary storing magazine 500 temporarily stocks the recorded film sheets EF received therein from the image recording section 300 while discharging the recorded film sheets EF into the automatic developing machine 700 whenever necessary. Hence, image recording is executed without interruption and parallel to discharge of the film sheets into the automatic developing machine 700, enhancing the capability of the image recording apparatus.

DELETION OF EXPOSED MARGIN

Figure 22:
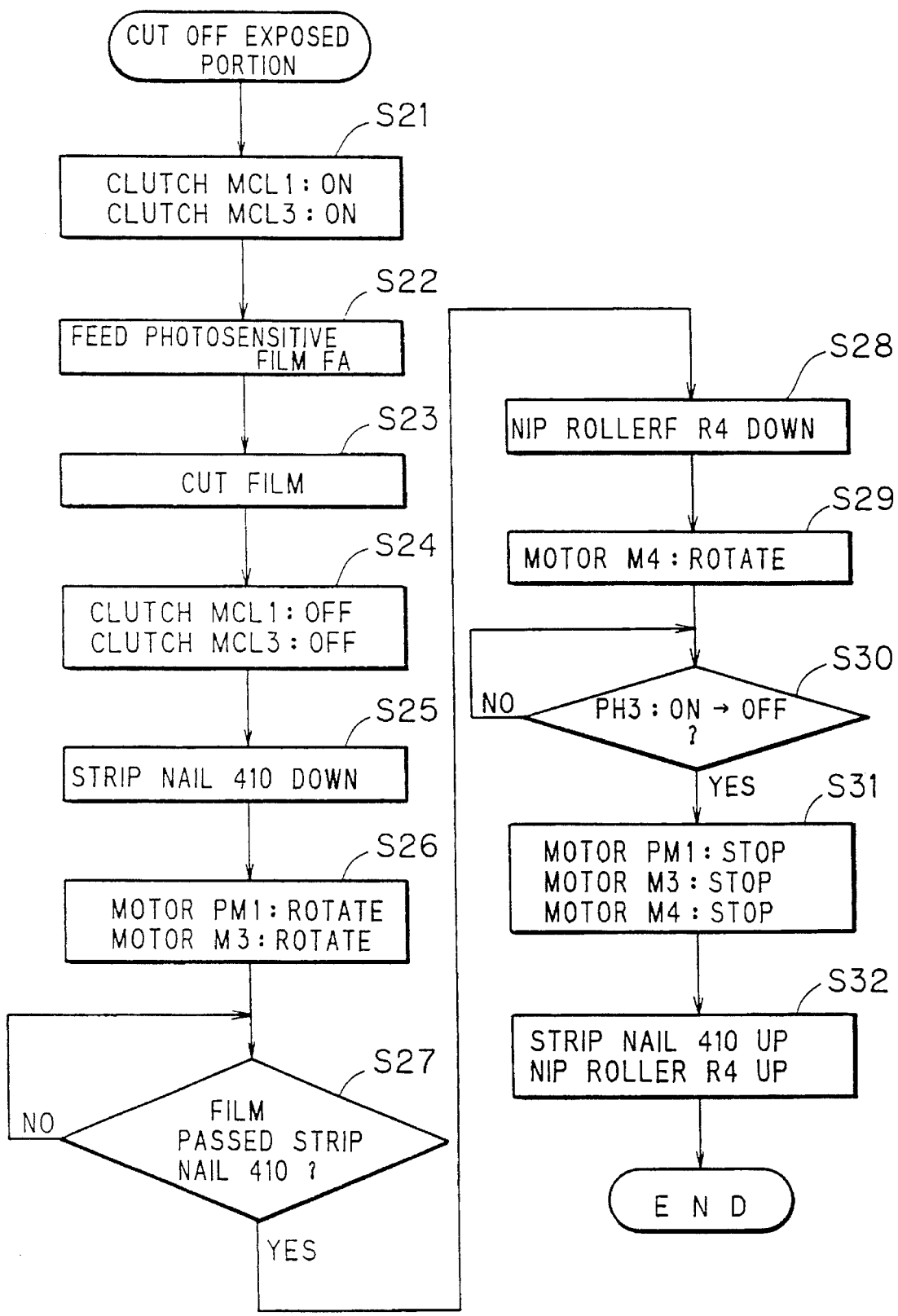
FIG. 22 is a flow chart showing the sequence of operations during cutting off of an exposed portion of a photosensitive film.

FIG. 22 is a flow chart showing the sequence of operations during cutting off of an exposed portion of the photosensitive film. The actions in the image apparatus at the individual stages of the cutting off will be described in detail with reference to FIGS. 23 to 25. First, it is judged whether the respective sections are initialized. (appropriately conditioned) to commence the cutting off sequences. The initial conditions include: the nip roller R4 and the strip nail 410 are raised and the clutches MCL1 to MCL3 are turned off. If the initial conditions are already realized, the clutches MCL1 and MCL3 are turned on (Step S21). In response to this, the transport section 200 enters the MODE 3 (See preceding Table 1). This means that if the pulse motor PM1 is driven, the rollers RA, R1, R2 and R3 rotate simultaneously, and hence, feed the photosensitive film FA to the recording drum 320 from the supply magazine 100A.

Figure 23:
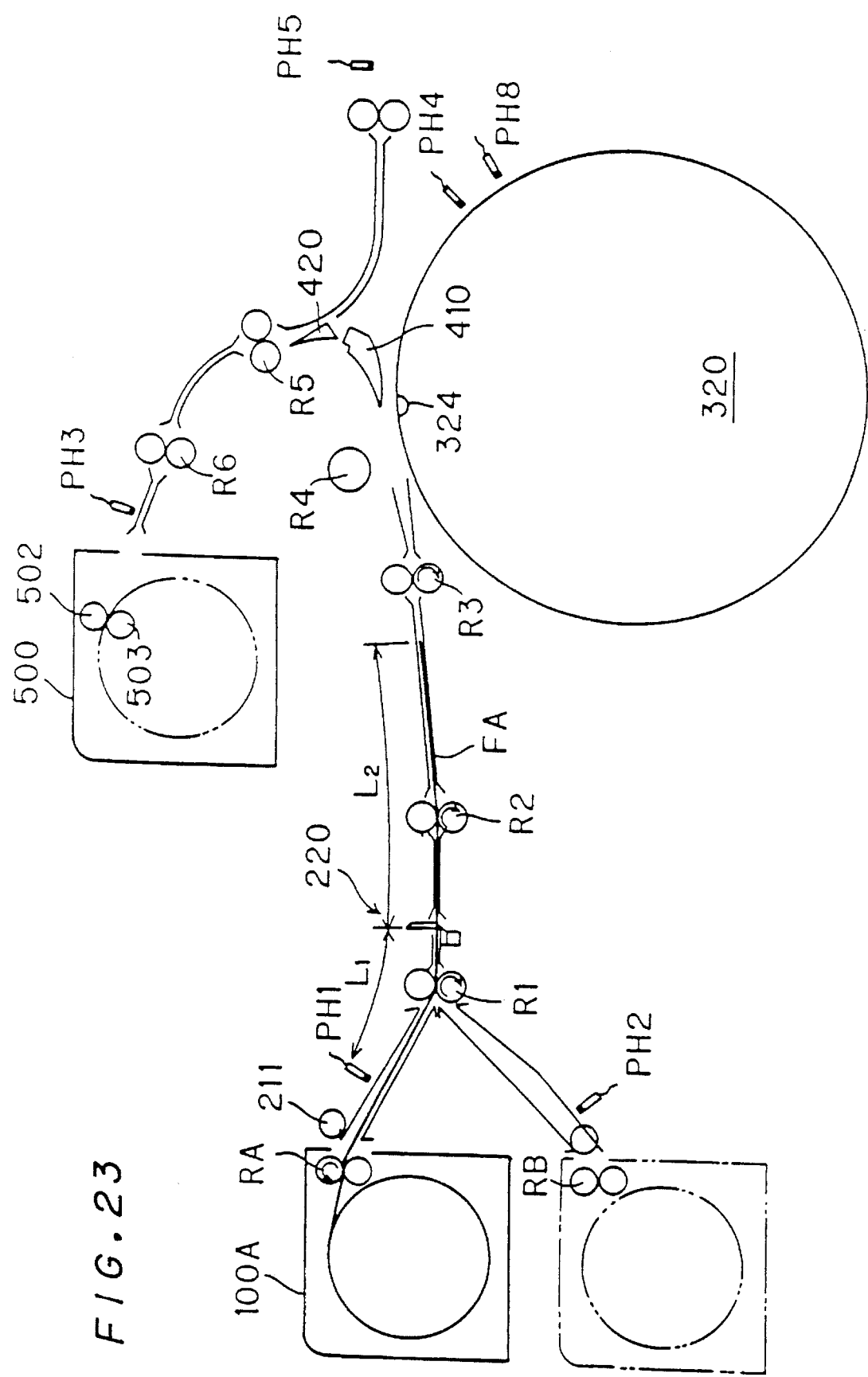
FIGS. 23 to 25 are schematic diagrams of the image recording apparatus of FIG. 1 during successive stages in the process of cutting off of the exposed portion of the photosensitive film.

Next, the pulse motor PM1 is driven, thereby drawing the photosensitive film FA out of the supply magazine 100A until the sensor PH1 turns on. The photosensitive film FA is further advanced an additional distance (L1+L2) towards the recording drum 320 as shown in FIG. 23 where L1 is a distance between the sensor PH1 and the cutter mechanism 220 and L2 is a length which the photosensitive film FA is to be cut (Step S22).

In Step S23, the cutter mechanism 220 cuts the exposed portion (hereinafter "exposed film segment P") from the photosensitive film FA. That is, if the cutters 222 and 223 are on their leftmost positions (i.e., the limiter switch LS4 is ON), the motor M2 is driven so that the photosensitive film FA is severed by the stationary cutter 221 and the movable cutter 223. On the other hand, if the cutters arc on their rightmost positions (i.e., the limiter switch LS5 is ON), the photosensitive film FA is cut by the stationary cutter 221 and the movable cutter 222.

The film cutting is followed by turning off of the clutches MCL1 and MCL3, which brings the transport section 200 into MODE 1 (Step S24), and engagement of the tip of the lowered strip nail 410 with the recesses 324 of the recording drum 320 (Step S25). Since the change-over member 420 moves at the same time that the strip nail 410 descends, a path is created which guides the exposed film segment P toward the temporary storing magazine 500.

Figure 24:
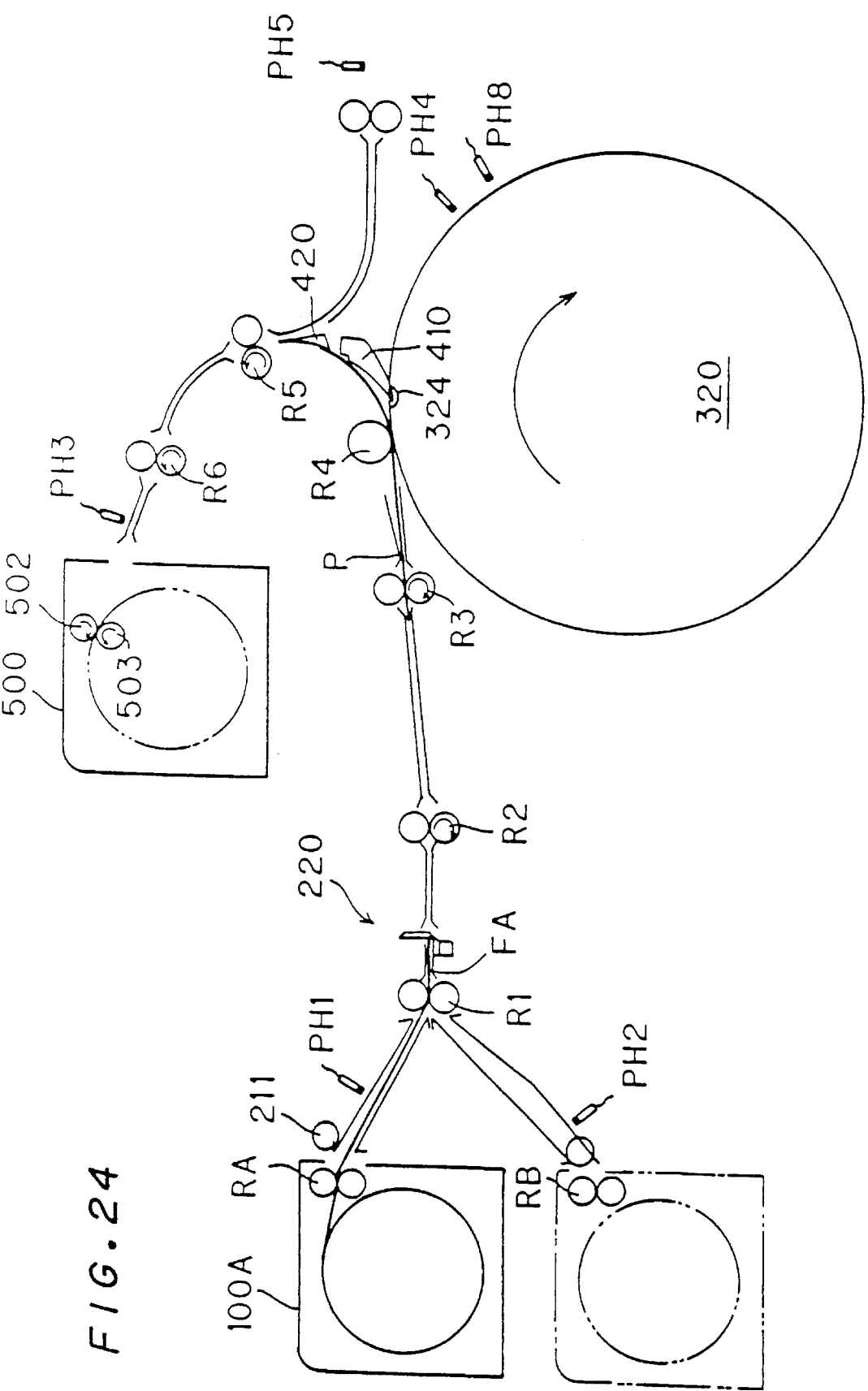

The exposed film segment P is then fed towards the recording drum 320 by the roller sets R2 and R3 which are driven into rotation by the pulse motor PM1 (Step S26). At the same time, the motor M3 starts driving. The nip roller R4 is thereafter lowered into contact with the recording drum 320 to place the exposed film segment P into the roller-drum nip (FIG. 24, Step S28).

Figure 25:
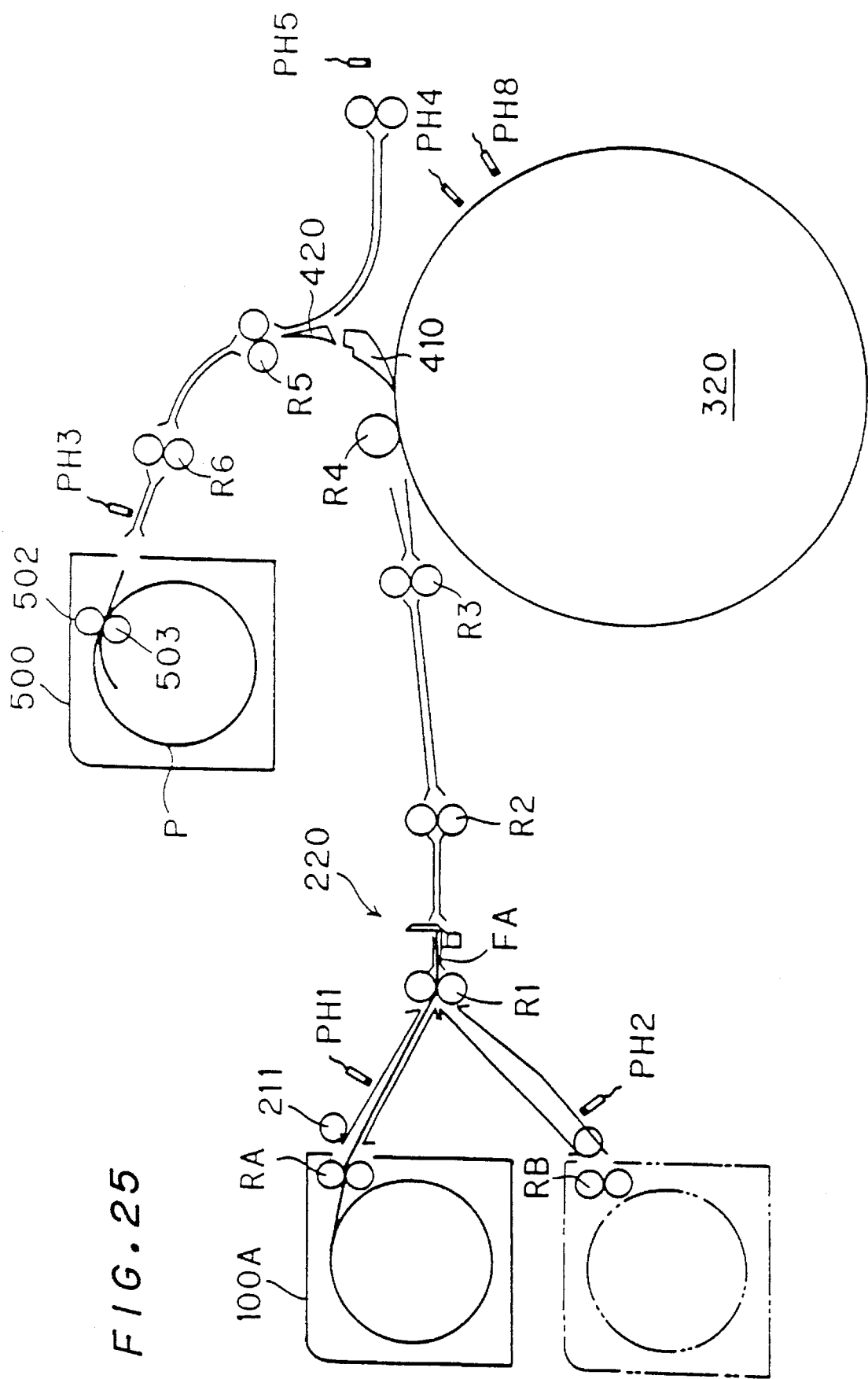

In addition to the motors mentioned above, the motor M4 is driven so that the recording drum 320 and the nip roller R4 feed the exposed film segment P towards the temporary storing magazine 500 (Step S29). The exposed film segment P on the way to the temporary storing magazine 500 is received by the roller sets R5 and R6 which are in rotation by the motor M3, and discharged into the temporary storing magazine 500 by the roller sets R5 and R6. Detecting the presence of the exposed film segment P, the sensor PH3 turns on. The sensor PH3 turns off when the exposed film segment P has been completely discharged into the temporary storing magazine 500 (FIG. 25).

The ON-to-OFF change of the sensor PH3 is detected (Step 30), and the motors PM1, M3 and M4 are disabled a certain time interval later (Step S31). This completes discharge of the exposed film segment P into the temporary storing magazine 500.

Next, the strip nail 410 and the nip roller R4 are moved upwards off the recording drum 320 to initialize the image recording apparatus (Step S32).

The exposed film segment P thus fed into the temporary storing magazine 500 may be discharged into the automatic developing machine 700 by UNLOADING 2 (described later), or alternatively manually taken out of the temporary storing magazine 500.

LOADING

Figure 26:
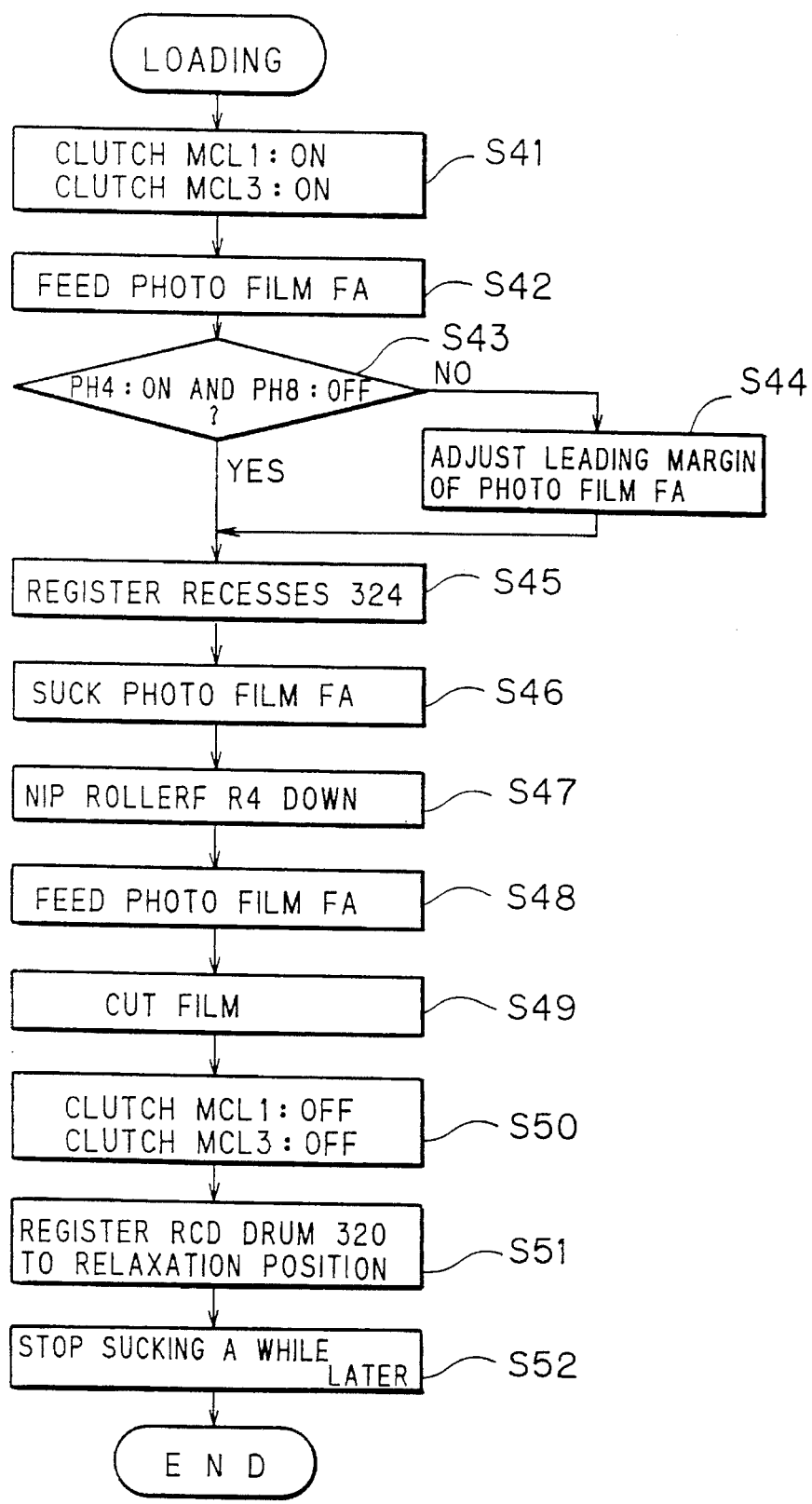
FIG. 26 is a flow chart showing the film loading operation.
Figure 27:
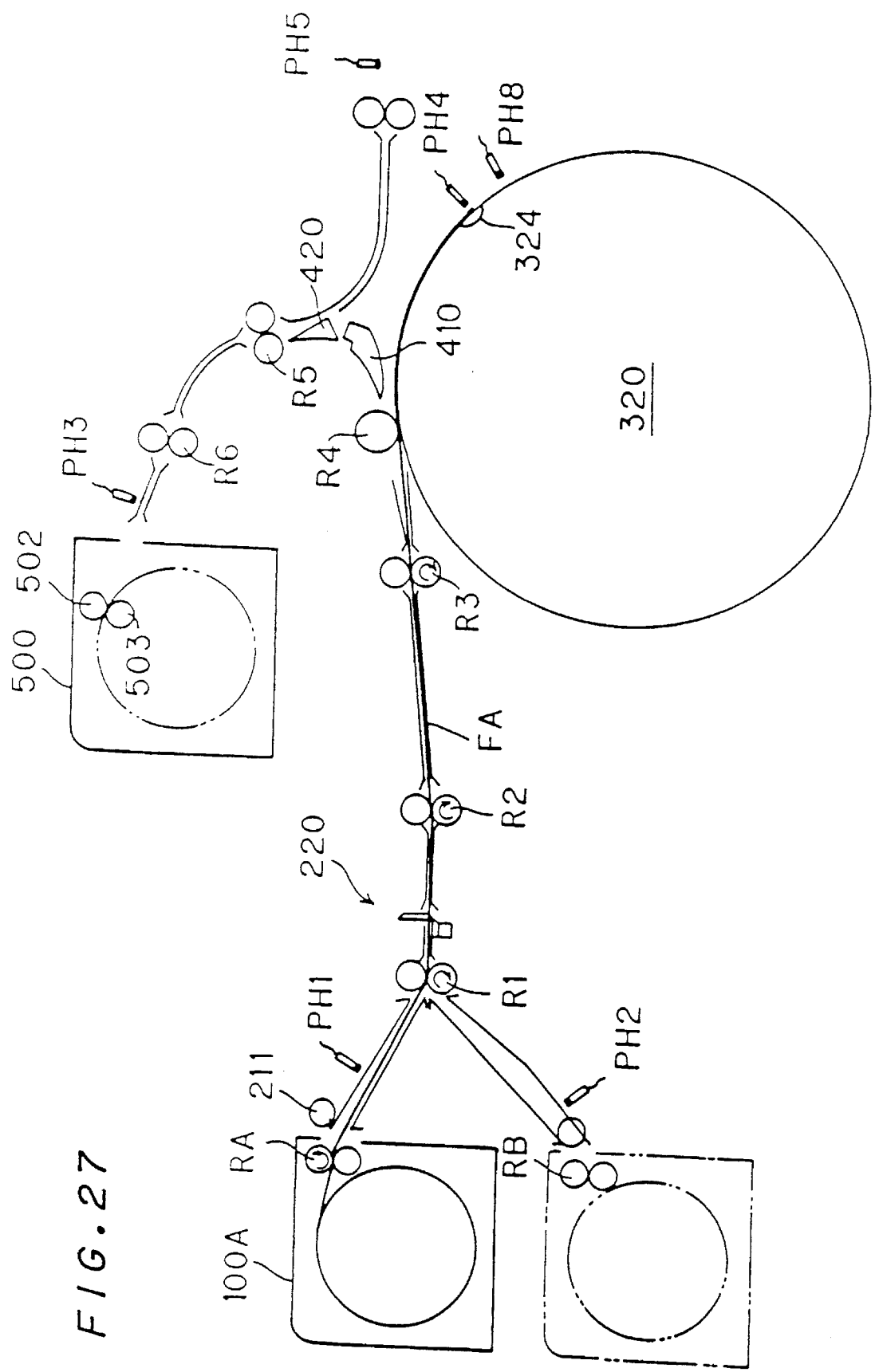
FIGS. 27 to 29 are schematic diagrams of the image recording apparatus of FIG. 1 during successive stages in the process of loading.

FIG. 26 is a flow chart illustrating LOADING which will be described now in detail with reference to FIGS. 27 to 29. At the beginning of LOADING, the leading margin of the photosensitive film FA is in the cutter mechanism 220, and the nip roller R4 and the strip nail 410 are a distance off the recording drum 320.

First, the clutches MCL1 and MCL3 are turned on (Step S41) so that the transport section 200 enters MODE 3 to make film transfer to the recording drum 320 ready.

Next, the pulse motor PM1 is driven to feed the photosensitive film FA by a distance L3, a distance between the cutter mechanism 220 and the sensor PH4, towards the recording drum 320 (Step S42).

It is then judged whether the sensor PH4 is ON and the sensor PH8 is OFF, in other words, whether the photosensitive film FA has inadvertently fed past the sensor PH8 (Step S43). If the judgement at Step S43 is "NO," indicating that the leading margin of the photosensitive film FA is not found between the sensors PH4 and PH8, the position of the leading margin of the photosensitive film FA is adjusted (Step S44). That is, after being sent backward until the sensor PH4 turns off, the photosensitive film FA is fed forward again a small distance until the leading margin of the photosensitive film FA is registered between the sensors PH4 and PH8.

Upon registering of the leading margin of the photosensitive film FA, the recording drum 320 is rotated slowly so that the recesses 324 formed thereon are located between the sensors PH4 and PH8 and immediately below the leading margin of the photosensitive film FA (Step S45).

This is followed by actuating the blower 350 is to suck a portion of the photosensitive film FA on the recording drum 320 (Step S46). Then, the nip roller R4 slides downwards to urge the photosensitive film FA against the recording drum 320 as shown in FIG. 27 (Step S47).

Figure 28:
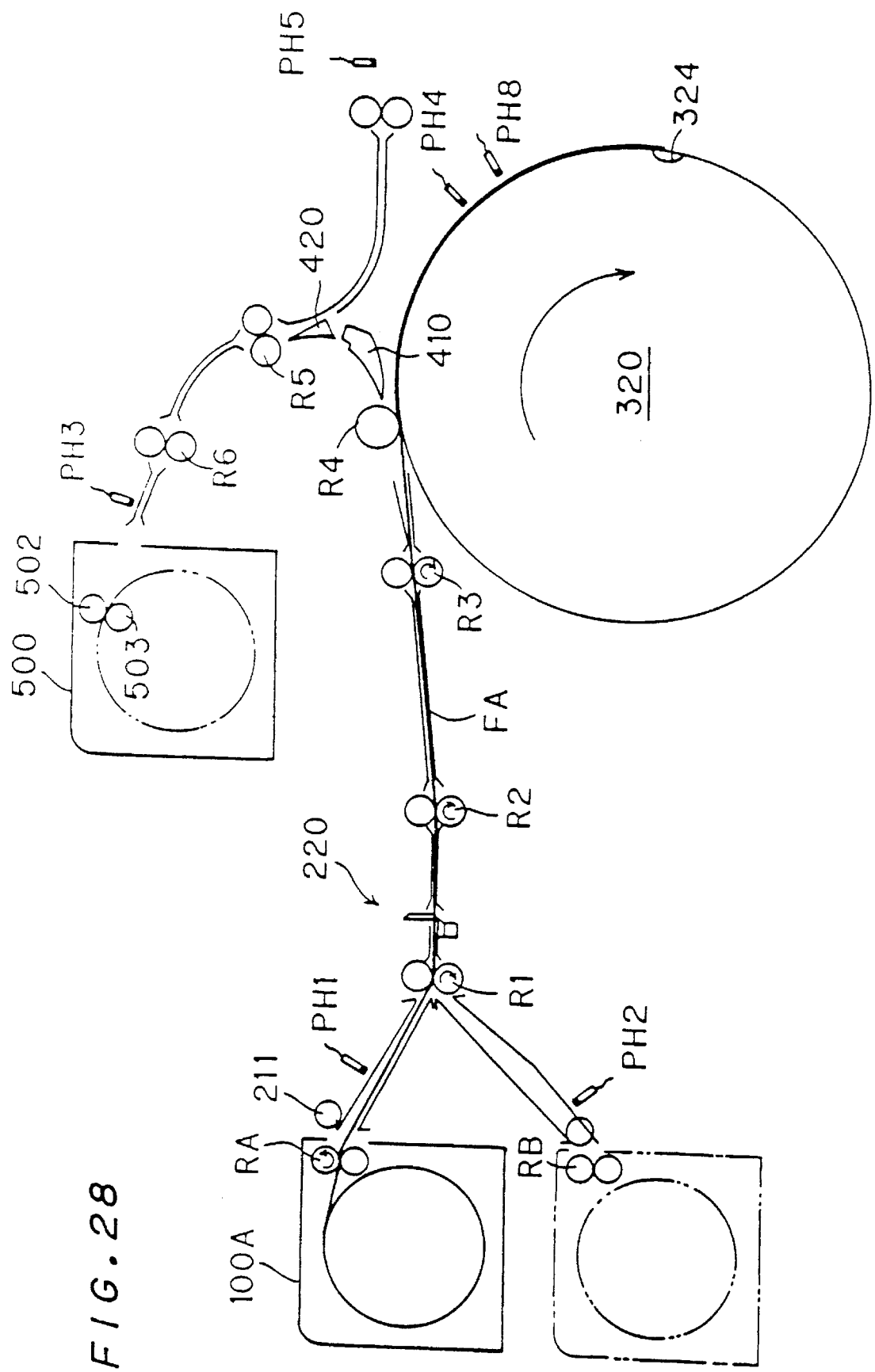

The pulse motor PM1 and the motor M1 are thereafter driven again so that the photosensitive film FA is fed toward the recording drum 320 by a predetermined distance L4, or a distance between the sensor PH4 and the location of the leading margin of the photosensitive film FA at the stage shown in FIG. 28 (Step S48, FIG. 28).

Next, a film sheet F of the length L (=L3+L4) is cut from the photosensitive film FA by the cutter mechanism 220 (Step S49). The clutches MCL1 and MCL3 are turned off so that MODE 1 for the transport section 200 is then invoked (Step S50). In other words, the transport section 200 is brought into a condition wherein the roller sets R2 and R3 feed only the film sheet F towards the recording drum 320 if the pulse motor PM1 is driven.

Figure 29:
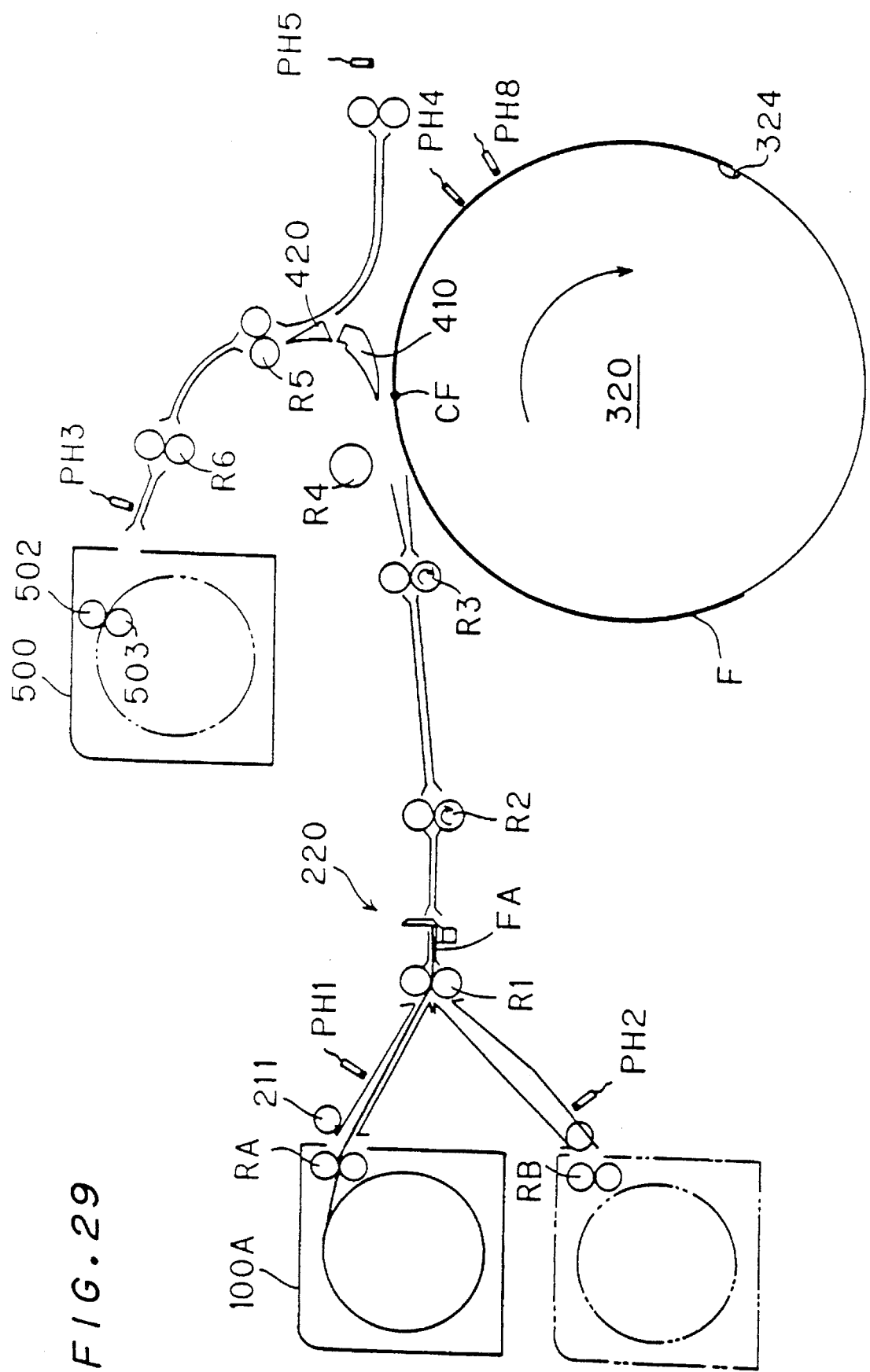

In Step S51, the pulse motor PM1 is activated and the film sheet F is fed towards the recording drum 320, in synchronism with which the motor M4 is driven to rotate the recording drum 320 until a center position CF of the film sheet F comes immediately below the strip nail 410 (FIG. 29). More precisely, the recording drum 320 is rotated at least once and then stopped when an intermediate point between the leading and the rear margins of the film sheet F (center of the film CF) is located on a line drawn upright from the rotation shaft of the recording drum 320. With the recording drum 320 set in such a position, or "relaxation position" as herein termed, the film sheet F hangs down approximately the same length from the center of the film CF to the leading and the rear margins.

After setting the recording drum 320 to the relaxation position, the nip roller R4 is lifted upwards to release the film sheet F from the nip of the nip roller R4 and the recording drum 320, and the blower 350 is disabled to release the film sheet F from the suction air which has been holding the same on the recording drum 320 (Step S52). Since the film sheet F hangs down the same length on two sides on the recording drum 320, the film sheet F won't drop off of the recording drum 320. A certain period of time later, e.g., in a few seconds, the blower 350 is actuated again to create suction that holds film sheet F onto the recording drum 320.

It is to be noted that re-actuation of the blower 350 sometimes fails to attain desired re-suction holding of the film sheet F if the film sheet is long, since a long film sheet would lose contact with the recording drum 320 at the leading and the rear margins. To prevent the leading and the rear margins of the film sheet F from leaving the recording drum 320 beyond preselected distances, the recording drum 320 is mounted in a round recess 910 of the frame 310 and a lower portion of drum 320 is, partially surrounded by a round guide 911. By thus eliminating the suction force which holds the film sheet F on the recording drum 320 for a predetermined period of time (relaxation), distortions are eliminated which were created in the film sheet F during preceding operations such as mounting to the recording drum 320 and urging action of the nip roller R4. This makes it possible to accomplish DRAWING of the film sheet F without distortion, attaining an enhanced recording accuracy.

Although the foregoing has described that the relaxation, i.e., elimination of the suction and the re-suction a while later with the recording drum 320 set at the relaxation position, is required only once, the relaxation may be performed a plurality of times. Further, instead of totally eliminating the suction, the suction force may be weakened. More particularly, the same effect is attained by reducing the suction for a certain period of time and subsequently increasing the suction to the former level at least once. Elimination of the suction is otherwise accomplished even quicker by blowing a jet of air onto the film sheet F from inside.

The recording drum 320 is also registered in such a manner that the intermediate point between the leading and the rear margins of the film sheet F (the center of the film FC) is located on a line drawn upright from the rotation shaft of the recording drum 320. However, the recording drum 320 may be set at any position since the intermediate point of the film sheet F is roughly located at such a position and would not fall off if the suction is eliminated or weakened. The definition of the intermediate point of the film sheet F as used in the present invention also covers such a case.

Figure 30:
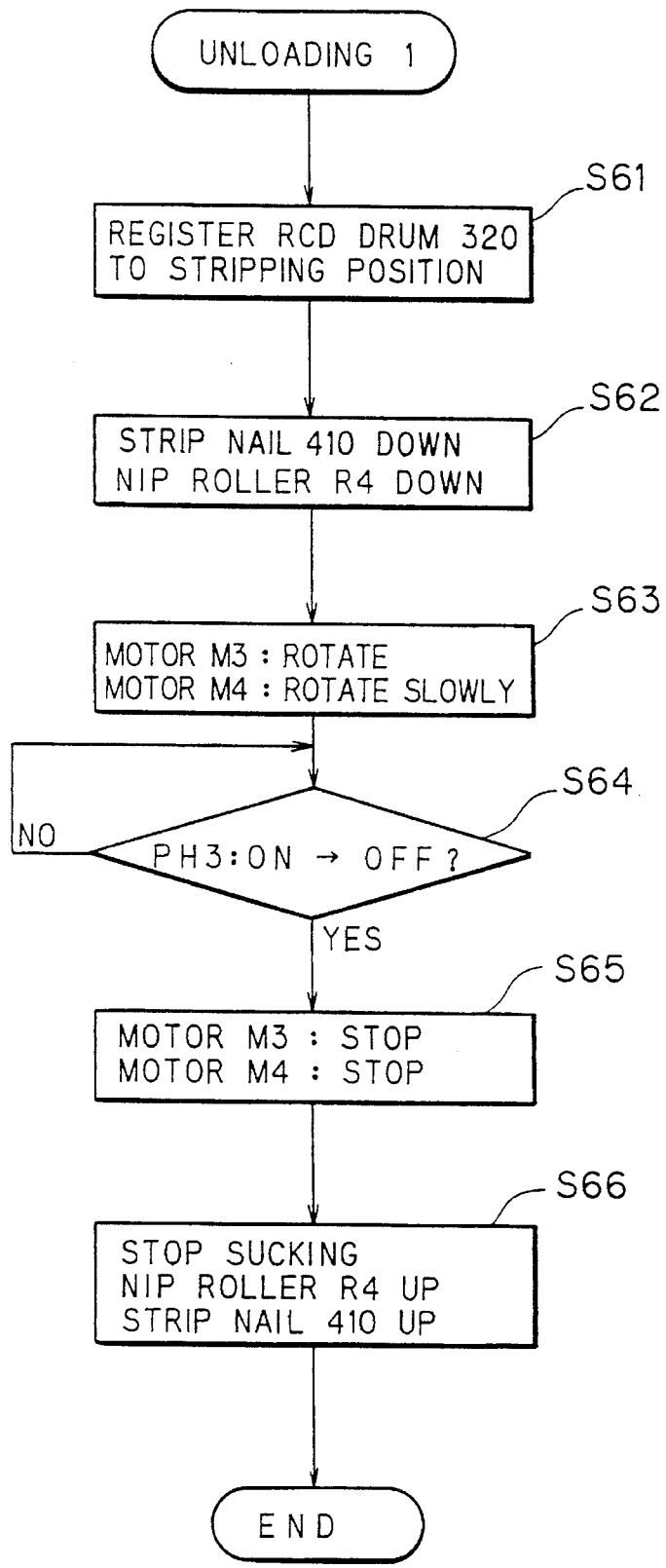
FIG. 30 is a flow chart showing UNLOADING 1.
Figure 31:
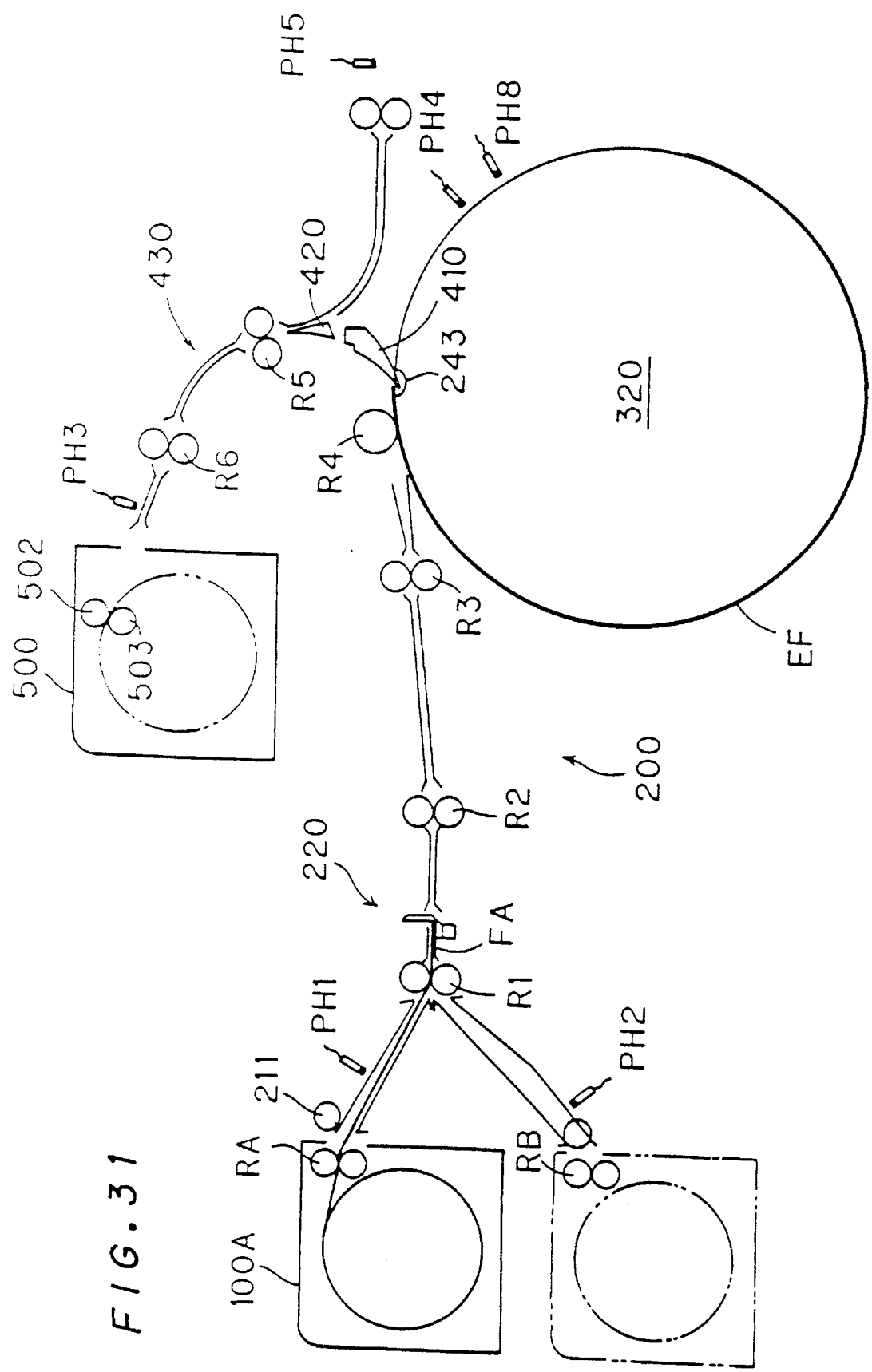
FIG. 31 is a schematic diagram of the image recording apparatus of FIG. 1 during UNLOADING 1.

FIG. 30 is a flow chart illustrating the sequence of operations of UNLOADING 1. First, the recording drum 320 is rotated until the recesses 324 are located immediately below the strip nail 410 (Step S61). The position of the recording drum 320 at this stage is herein termed as "stripping position."After setting the recording drum 320 at the stripping position, the strip nail 410 and the nip roller R4 are lowered (Step S62, FIG. 31), whereby the strip nail 410 enters the recesses 324 of the recording drum 320, as shown in FIG. 11, in readiness for stripping of the recorded film sheet EF off the recording drum 320.

Following this, the motor M3 starts driving the roller sets R5 and R6 (Step S63). At the same time, the motor M4 starts rotating the recording drum 320 at a slow speed. As a result, the rotation of the recording drum 320 strips the recorded film sheet EF off the recording drum 320 as best illustrated in FIG. 12. The recorded film sheet EF leaves the recording drum 320 and advances along the discharge path which is formed along the strip nail 410 and the change-over member 420 towards the discharge mechanism 430. Entering the nips of the roller sets R5 and R6, the recorded film sheet EF is further discharged towards the temporary storing magazine 500, turning the sensor PH6 on. The sensor PH6 turns off a while later, which indicates that the recorded film sheet EF has been completely discharged into the temporary storing magazine 500.

Detection of the ON-to-OFF change of the sensor PH6 is Step S64, which is followed a predetermined time duration later by having the motors M3 and M4 stop rotating (Step S65). This completes discharge of the recorded film sheet EF into the temporary storing magazine 500.

In the last step, the blower 350 is turned off to eliminate the suction, and the nip roller R4 and the strip nail 410 are retrieved upward (Step S66, FIG. 20).

UNLOADING 2

Figure 32:
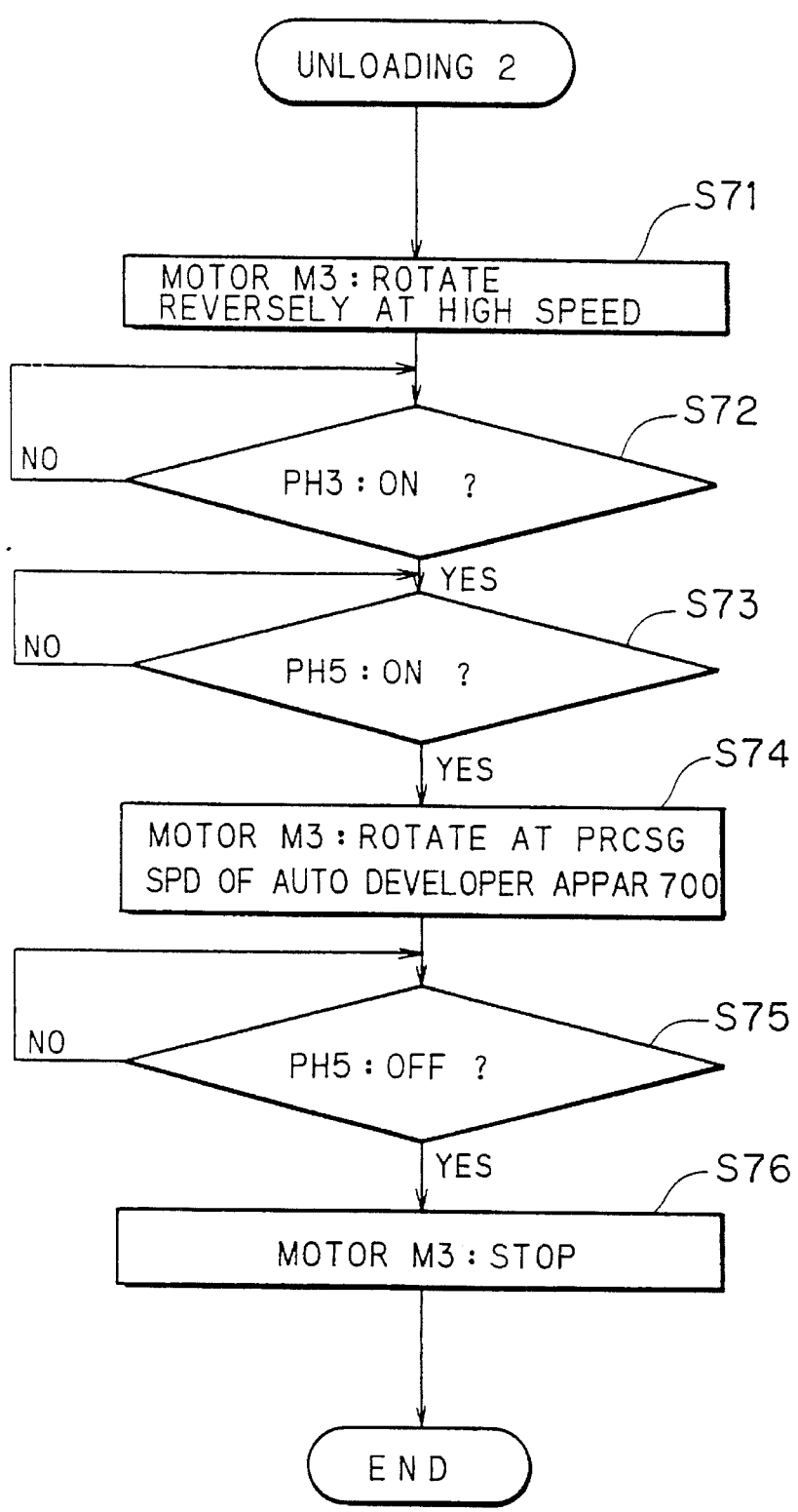
FIG. 32 is a flow chart showing UNLOADING 2.

FIG. 32 is a flow chart illustrating the sequence of operations of UNLOADING 2. The first step of UNLOADING 2 is to detect whether the image recording apparatus is ready for discharge of the recorded film sheets EF (or exposed film segment P) into the automatic developing machine 700. If the image recording apparatus is ready-for-discharge state and is called upon to do so by the automatic developing machine 700 via the communication part 630 of the control section 600, the image recording apparatus starts discharging the recorded film sheets EF in the following manner.

First, the motor M3 drives the roller sets R5 and R6 at a high speed in the reverse direction (Step S71), whereby the recorded film sheet EF is rapidly drawn out of the temporary storing magazine 500 and is fed along the change-over member 420 towards the automatic developing machine 700.

Figure 33:
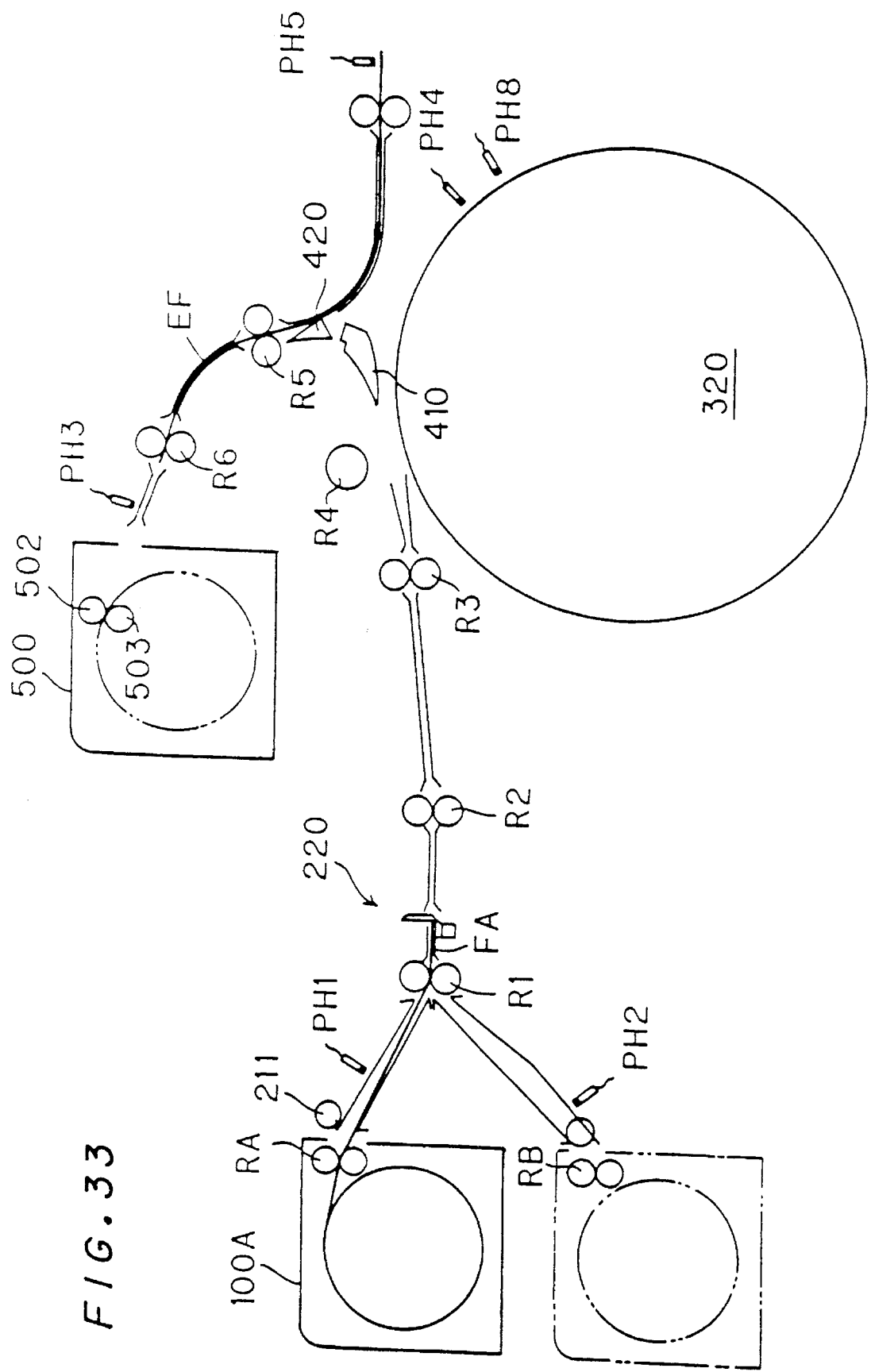
FIG. 33 is a schematic diagram of the image recording apparatus of FIG. 1 during UNLOADING 2.

Whether the sensors PH3 and PH5 are ON is then detected (Steps S72 and 73). The motor M3 is controlled such that the speeds of rotation the for roller sets R5 and R6 decrease down to the processing speed of the automatic developing machine 700 upon consecutive turning on of the sensors PH3 and PH5, i.e., when the leading margin of the recorded film sheet EF has passed the sensor PH5 as shown in FIG. 33 (Step S74).

An inquiry is then made whether the sensor PH5 turned off, or whether discharge of the recorded film sheet EF ban has completed (Step S75). If the judgement at Step S75 is "YES," the motor M3 is stopped a preselected period of time later (Step S76). Thus, discharge of the recorded film sheets EF from the temporary storing magazine 500 finishes in a reduced time since the recorded film sheets EF keep running at a high speed until the last moment before the discharge of the recorded film sheets EF.

D-2. SECOND CASE

Figure 34:
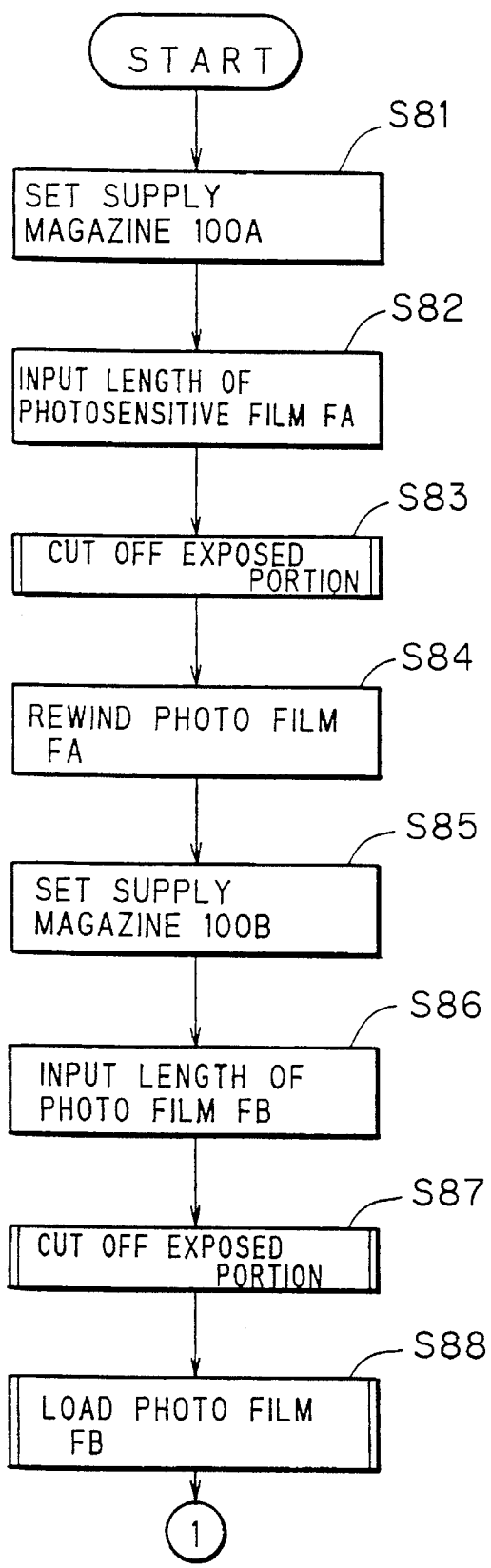
FIGS. 34 to 36 are flow charts showing the general sequence of events within the image recording apparatus of FIG. 1 for a second case of image recording.
Figure 35:
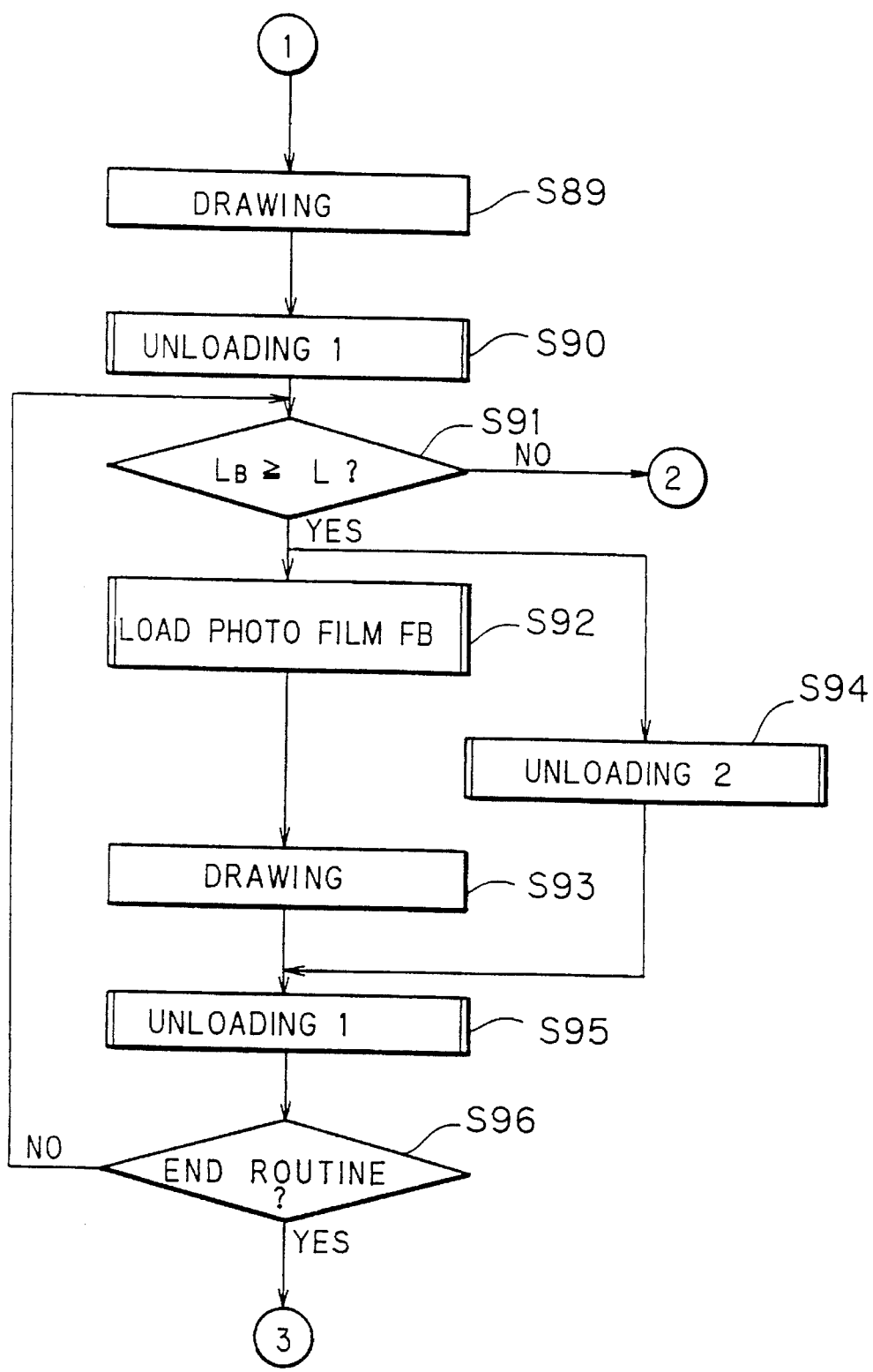
Figure 36:
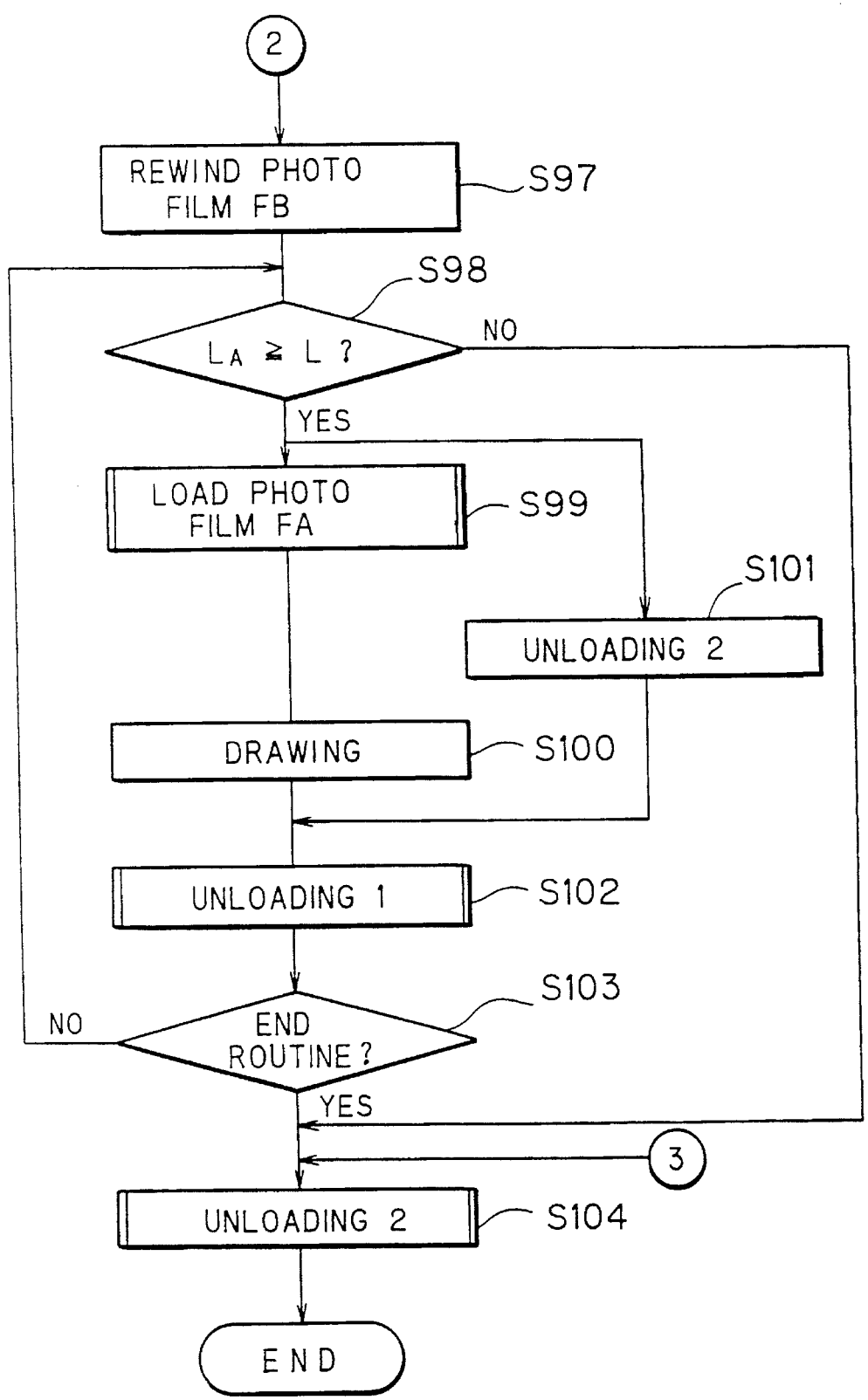

FIGS. 34 to 36 are flow charts showing the general sequence of events for the image recording apparatus in the second case which use a plurality of, for example, seven supply magazines each containing a photosensitive film. Data about the photosensitive films are stored in a memory (not shown) of the main control part 610 in advance. The data to be preliminarily stored arc widths W1 to W7, lengths L01 to L07 and remaining film amounts LR1 to LR7 of the photosensitive films.

First, in Step S81, the supply magazine which contains the photosensitive film of a predetermined width W is selected as the supply magazine 100A and inserted into the image recording apparatus. The sensors PH10 to PH12 immediately read the identification code (not shown) of the supply magazine 100A (the identification code is attached to the bottom cover 101) and confirms the remaining film amount LA of the photosensitive film FA which is housed in the supply magazine 100A. For example, if the first one of the seven supply magazines is the supply magazine 100A, the remaining film amount LR1 is stored in the memory of the main control part 610 as the remaining film amount LA. Instead of automatically confirming, an operator may key in the remaining film amount LA into the memory through the keyboard 641 of the control section 600 (Step S82).

Upon the confirmation of the remaining film amount, the leading margin, i.e., an exposed portion of the photosensitive film FA is cut off (Step S83), which is followed by reverse rotation of the pulse motor PM1 to rewind the photosensitive film FA (Step S84).

Next, in Step S85, the supply magazine which contains a photosensitive film of the same width W is set to the image recording apparatus as the supply magazine 100B. The identification code of the supply magazine 100B is immediately read by the PH13 to PH15, and the remaining film amount LB of the photosensitive film FB contained in the supply magazine 100B is loaded into the memory of the main control part 610, or otherwise inputted by the operator through the keyboard 641 (Step S86).

Figure 37:
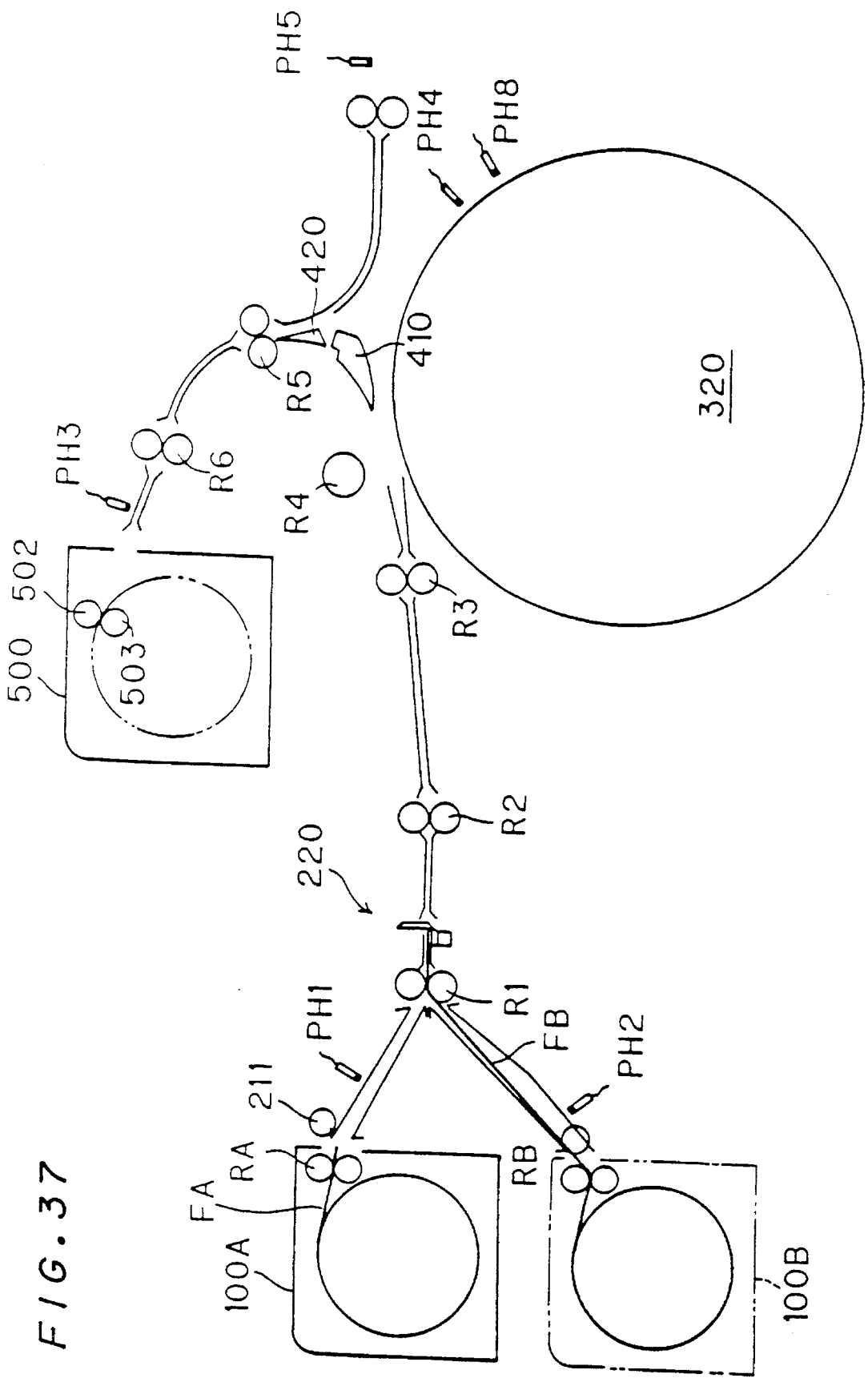
FIG. 37 is a schematic diagram showing the general sequence of events within the image recording apparatus of FIG. 1 for the second case of image recording.

The leading margin of the photosensitive film FB is cut off (Step S87). This completes insertion of the two supply magazines 100A and 100B into the image recording apparatus (See FIG. 37).

The supply magazine 100B is used as a film supply source, first. Hence, a film sheet F of a predetermined size (width X and length L) is separated in a similar manner from the photosensitive film FB which is contained in the supply magazine 100B and which is supported on the recording drum 320 (Step S88). The film size is to be loaded beforehand by the operator. Concurrently with the film cutting, the length L of the film sheet F is subtracted from the preserved film length and the film amount LB consequently calculated is stored in the memory.

Following this, a desired image is recorded onto the film sheet F (Step S89), and the recorded film sheet EF thus produced is fed into the temporary storing magazine 500 (Step S90).

The remaining film amount LB and the length L are then compared (Step S91). If the former is larger than the latter, in other words, if the photosensitive film FB left in the supply magazine 100B is long enough to produce a desired film sheet EF which is to carry a recorded image, similarly to the first case, the routine proceeds to Steps S92 to S95. Steps S91 to S95 are successively repeated thereby producing the desired film sheets EF until it is determined to end DRAWING at Step S96.

On the other hand, if it is detected that the remaining film amount LB is smaller than the length L at Step S91, i.e., if the photosensitive film FB left in the supply magazine 100B cannot afford another round of DRAWING, the display 642 shows a message indicative of such and the photosensitive film FB is rewound (Step S97). The supply magazine 100B is then replaced with the supply magazine 100A in the following manner to thereby commence production of the desired film sheets EF from the photosensitive film FA.

In the course of DRAWING using the photosensitive film FA, the remaining film amount LA and the length L are then compared (Step S98). If the former is found larger than the latter, the sequence of operations proceeds to Steps S99 to S102, similar to the first case. Steps S99 to S102 are repeated without a pause until it is decided to end DRAWING at Step S103, during which the desired film sheets EF are produced one after another. In the opposite case where the remaining film amount LA is smaller than the length L (Step S103), a message indicating the same appears on the display 642.

When it is decided that DRAWING needs to end at Steps S97 and S103 or when the photosensitive films FA or FB contained in the supply magazine 100A or 100B is found not long enough for another film sheet F of the predetermined size (width X and length L), the recorded film sheets EF temporarily retained in the temporary storing magazine 500 are discharged into the automatic developing machine 700 (Step S104).

Summarizing the description above, in the second case, a photosensitive film contained in the second supply magazine is used when the amount of a photosensitive film left in the first supply magazine becomes to small. Hence, besides the effect promised in the first case, the image recording apparatus can keep running for a longer time. In addition, the image recording apparatus can attain even better operation efficiency. Such longer continued image recording is made possible by exchanging the supply magazine 100B with a new supply magazine 100B which contains a new photosensitive film FB when the film supply source is switched, and by switching the film supply source again to the supply magazine 100B when the supply magazine 100A has run short of the photosensitive film FA.

D-3. THIRD CASE

Figure 38:
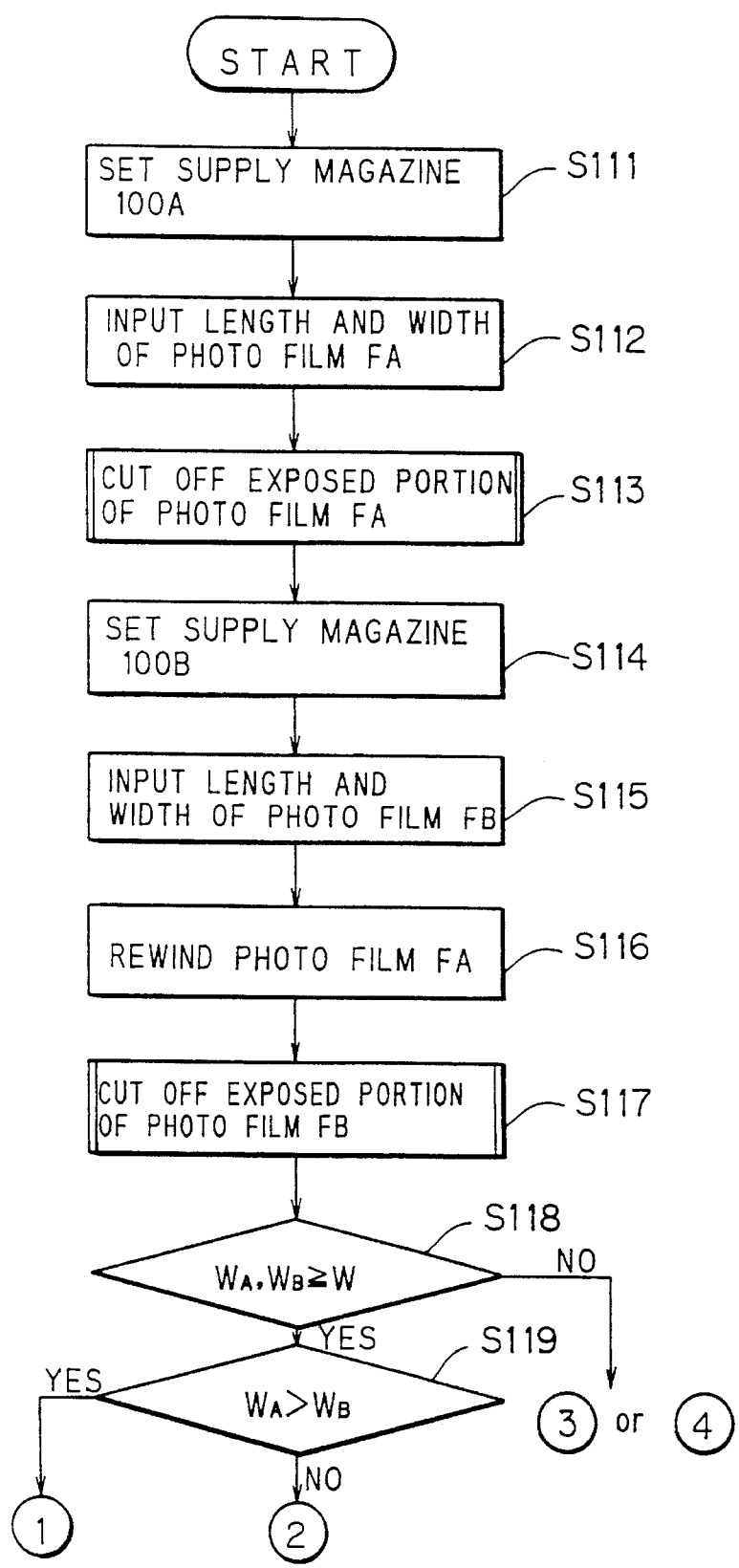
FIGS. 38 to 40 are flow charts showing the general sequence of events within the image recording apparatus of FIG. 1 for a third case of image recording.
Figure 39:
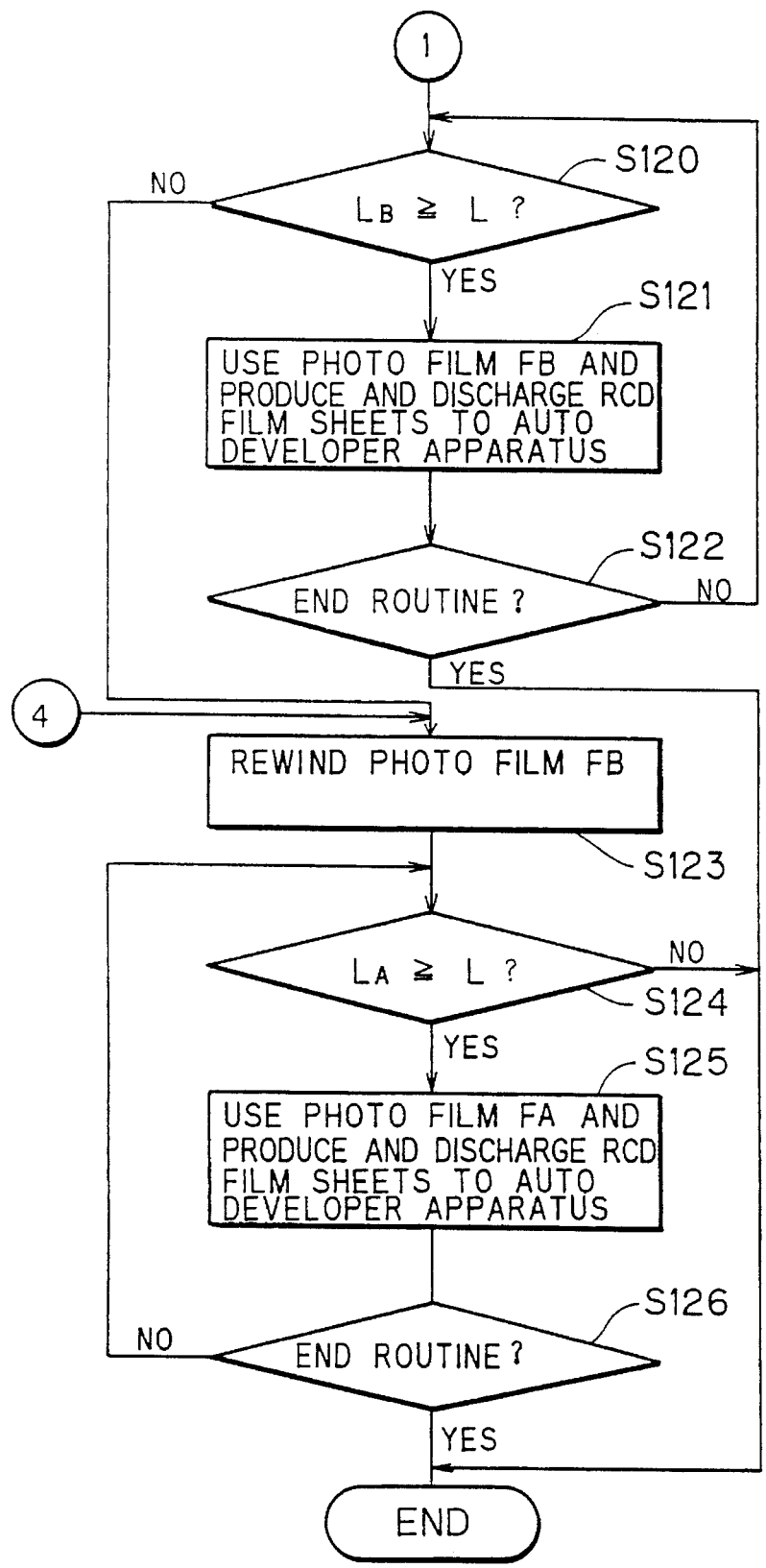
Figure 40:
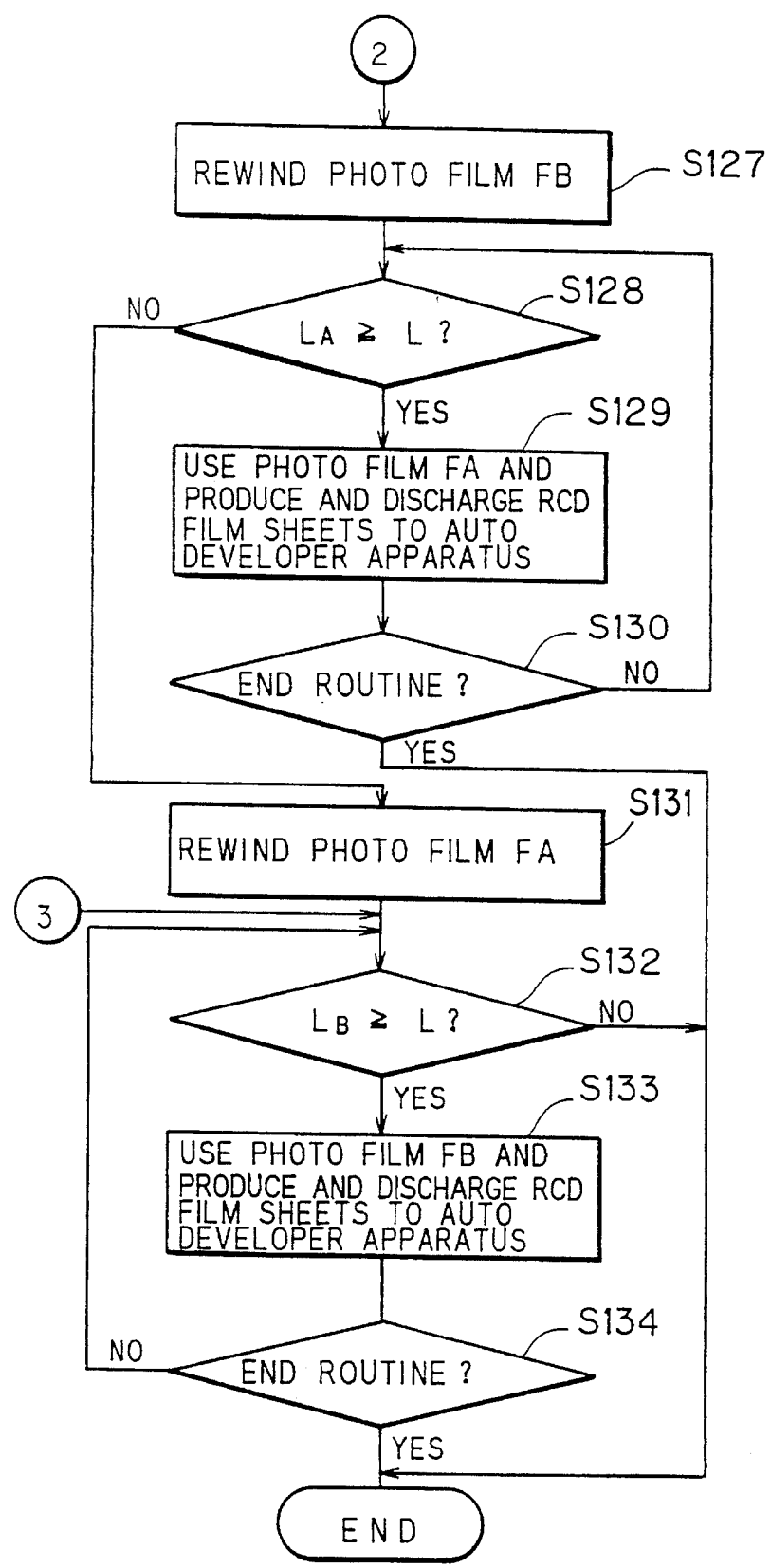

FIGS. 38 to 40 are flow charts generally showing the sequence of actions of the image recording apparatus in the third case. First, of a plurality of supply magazines, one containing a photosensitive film of the width WA is inserted into the image recording apparatus as the supply magazine 100A (Step S111). The sensors PH10 to PH12 immediately read the identification code of the supply magazine 100A, and the remaining film amount LA and the width WA of the photosensitive film FA are stored in the memory of the main control part 610 (Step S112). An exposed portion of the photosensitive film FA is then cut off (Step S113).

Next, the supply magazine which contains a photosensitive film of a different width WB is inserted into the image recording apparatus as the supply magazine 100B (Step S114). The identification code of the supply magazine 100B is sensed by the sensors PH13 to PH15, and the memory of the main control part 610 receives the remaining film amount LB and the width WB of the photosensitive film FB from the sensors PH13 to PH15 (Step S115). The operator may input the remaining film amounts and the widths through the keyboard 641 as in the second case.

This is followed by rewinding of the photosensitive film FA (Step S116) and cutting off of an exposed portion of the photosensitive film FB (Step S117).

An inquiry is then made as to whether the widths WA and WB of the photosensitive films FA and FB are each equal to or wider than the width W (Step S118). If the photosensitive films FA and FB are found to be as wide as or wider than the width W, the widths WA and WB are compared with each other (Step S119).

Confirming the judgement at the Step S119 is "YES," i.e., WA>WB, the routine proceeds to Steps S120 to S126 (See FIG. 39). That is, it is judged whether the photosensitive film FB left in the supply magazine 100B, the current film supply source, has the amount LB longer than the length L which is necessary for another production of a film sheet F (Step S120). If the judgement is "YES," LOADING, DRAWING, UNLOADING 1 and UNLOADING 2 are performed to produce recorded film sheets EF which will be discharged into the automatic developing machine 700 later (Step S121). Steps S120 and S121 are repeated until it is decided to end the routine at Step S122, thereby continuously outputting finished film sheets EF into the automatic developing machine 700. On the other hand, if the judgement at Step S120 is "NO," i.e., the remaining film amount LB of the photosensitive film FB is smaller than the length L which is needed for another film sheet F, the photosensitive film FB is rewound (Step S123). Upon rewinding of the photosensitive film FB, the supply magazine 100A starts functioning as the film supply source instead of the supply magazine 100B. As long as the remaining film amount LA of the photosensitive film FA is not smaller than the length L, which is needed for another film sheet F, and as long as it is judged that continued image recording is necessary, the image recording apparatus keeps producing the recorded film sheets EF from the photosensitive film FA and discharging the recorded film sheets EF into the automatic developing machine 700 whenever appropriate (Step S125).

If the judgement at Step S119 is "NO," that is, WA<WB, the routine proceeds in reverse as to order the as as of the above (i.e., Steps S120 to S126). More precisely, as shown in FIG. 40, the photosensitive film FB is rewound (Step S127), and production of the recorded film sheets EF is continued with the photosensitive film FA during which the recorded film sheets EF are discharged into the automatic developing machine 700 whenever necessary (Step S129). If it is detected that the remaining amount of film LA of the photosensitive film FA is smaller than the length L which is needed for another film sheet F (Step S128), the photosensitive film FA is rewound (Step S131). Following this, the image recording apparatus keeps producing the recorded film sheets EF from the photosensitive film FB and discharging the recorded film sheets EF into the automatic developing machine 700 whenever appropriate (Step S133).

Thus, even when the photosensitive films FA and FB set in the supply magazines 100A anti 100B have different widths WA and WB, the effect promised in the second case remains preserved. It is also to be noted that the reason for comparing the widths WA and WB at Step S119 and deciding to use the narrower film first is because such is the most certain way to finish the last film sheet which will be recorded last in the predetermined size (width X and length L). It should be apparent that either photosensitive film may be used first as the film supply source if such demand does not exist.

At Step S118, if the judgement is "NO," i.e., if at least one of the photosensitive films FA and FB is narrower than the width W, the image recording apparatus chooses the one which has the width W or a wider width as the film supply source, and keeps on producing the recorded film sheets EF and discharging the recorded film sheets EF into the automatic developing machine 700.

Although the third case has been described as requiring that the image recording apparatus end its operations upon completion of image recording using a photosensitive film width which is equal to or larger than the width W, the image recording apparatus can operate on a longer uninterrupted basis if supplied at an appropriate timing with a new photosensitive film which has the width W or a wider width. For example, the photosensitive film FB is set in the supply magazine 100B while production of film sheets EF from the photosensitive film FA, which is contained in the supply magazine 100A, is still progressing. When the supply magazine 100A nearly runs short of the photosensitive film FA, the film supply source is quickly switched to the supply magazine 100B. As a result, operating efficiency of the image recording apparatus is improved.

While the invention has been described in detail, the foregoing description is in all aspects illustrative and not restrictive. It is understood that numerous other modifications and variations can be devised without departing from the scope of the invention.

We claim:

1. An apparatus for recording an image on a photosensitive material sheet and discharging a recorded photosensitive material sheet into a developing machine in synchronism with an operation speed of said developing machine, said apparatus comprising:

supply means for containing a long photosensitive material;

transport means for cutting off a first part of said long photosensitive material supplied from said supply means by cutter means to obtain a first photosensitive sheet and then transporting said first photosensitive sheet to a predetermined position;

image recording means which is provided at said predetermined position and operable to apply light to said first photosensitive sheet to obtain a recorded photosensitive material on which a first image is recorded;

temporary storing means for temporarily retaining said recorded photosensitive material sheet which is produced by said image recording means;

discharge means for discharging said recorded photosensitive material sheet from said image recording means to said temporary storing means or otherwise from said temporary storing means to said developing machine; and control means that supplies a first instruction to said discharge means to cut off a second part of said long photosensitive material to obtain a second photosensitive sheet while said discharge means is still discharging said recorded photosensitive material sheet from said storage means into said developing machine, thereby cutting off a second part of said long photosensitive material as a second photosensitive sheet and transporting said second photosensitive sheet to said image recording means, said control means supply a second instruction to said image recording means to a record a second image on said second photosensitive sheet after said second photosensitive sheet is transported to said image recording means, thereby discharging said recorded photosensitive material sheet into said developing machine in synchronism with said operation speed of said developing machine.

2. An apparatus as defined in claim 1, wherein said image recording means comprises a frame, a recording drum rotatably supported by said frame, said recording drum having a slit which is formed on the surface of said recording drum, suction means connected to said slit for applying suction to said photosensitive material sheet provided onto the surface of said recording drum, an exposure head for reproducing the image on said photosensitive sheet, and a motor for rotating said recording drum.

3. An apparatus as defined in claim 2, wherein said recording drum further comprises a recess which is formed on the surface of said recording drum, and wherein said discharge means includes:

a strip nail disposed adjacent to said recording drum, the tip of said strip nail being engageable with said recess, means for moving said strip nail such that the tip of said strip nail is engaged with said recess, change-over means for controlling a discharge path of said recorded photosensitive material sheet, and discharge mechanism disposed between said change-over means and said temporary storing means for feeding said recorded photosensitive material sheet from said recording drum toward said temporary storing means and said recorded photosensitive material sheet from said temporary storing means toward said developing machine.

4. An apparatus as defining in claim 1, wherein said transport means includes:

a draw mechanism for drawing said long photosensitive material out of said supply means, a cutter mechanism constituting said cutter means and including a stationary cutter which has a blade edge, a movable cutter and a cutter drive mechanism which drives said movable cutter to a cut off said long photosensitive material from said supply means so as to form said photosensitive material sheet of the predetermined length, a supply mechanism for feeding said photosensitive material sheet to said image recording means, and a motor for supplying driving power to said draw mechanism and said cutter mechanism.

5. An apparatus as defined in claim 4, wherein said transport means further includes:

a first clutch linked to said draw mechanism, a second clutch linked to said supply mechanism, and means for controlling said first and second clutches so that said first clutch allows or otherwise blocks transfer of said driving power to said draw mechanism and so that said second clutch allows or otherwise blocks transfer of said driving power to said supply mechanism.

6. An apparatus as defined in claim 4, wherein said movable cutter rotatably slides along said blade edge of said stationary cutter.

7. An apparatus as defined in claim 1, wherein said temporary storing means includes:

a cover having a slit through which said recorded photosensitive material sheet is conveyed, a pair of rollers rotatably mounted to said cover, said rollers being adjacent to said slit, and an outer loop guide installed in said cover, said outer guide forming an endless path which runs on the contact area of said rollers.

8. An apparatus as defined in claim 7, wherein said temporary storing means further includes an inner loop guide installed in said cover, said inner loop guide being opposed to said outer loop guide and cooperating with said inner loop guide to form said endless path.

9. This apparatus of claim 1, wherein said temporary storing means for temporarily retaining said recorded photosensitive material sheet which is produced by said image recording means has a circular cross section for forming an endless film path, and retains said recorded photosensitive material in the form of loops in said endless film path.

10. A method of recording an image on a photosensitive material sheet which is held on a recording drum that is rotatable on a rotation shaft, said method comprising the steps of:

preparing and unexposed photosensitive material sheet of a predetermined length;

disposing said unexposed photosensitive material sheet on said recording drum;

applying suction to said unexposed photosensitive material sheet on said recording drum, whereby said unexposed photosensitive material sheet is held on said recording drum;

rotating said recording drum holding said unexposed photosensitive material sheet to a relaxing position, said relaxation position being where a intermediate point between leading and rear margins of said unexposed photosensitive material sheet is located substantially on a line drawn upright from the rotation shaft of said recording drum;

performing a relaxation treatment for ridding said unexposed photosensitive material sheet attached to the drum of distortion when said drum is at said relaxation position that includes releasing said unexposed photosensitive material sheet on said recording drum from the suction for a predetermined period of time such that said unexposed photosensitive material sheet hangs over said drum without falling off of said drum, and thereafter applying suction to said unexposed photosensitive material sheet for the unexposed photosensitive material sheet to hold said unexposed sheet on said recording drum again; and recording an image on said unexposed photosensitive material sheet which is held on said recording drum again.

11. A method as defined in claim 10, wherein said step of performing said relaxation treatment is performed a plurality of times.

12. A method of recording an image on a photosensitive material sheet which is held on a recording drum that is rotatable on a rotation shaft, said method comprising the steps of:

preparing an unexposed photosensitive material sheet of a predetermined length;

disposing said unexposed photosensitive material sheet on said recording drum;

applying suction to said unexposed photosensitive material sheet on said recording drum, whereby said unexposed photosensitive material sheet is held on said recording drum suction force of a first level;

rotating said recording drum which holds said unexposed photosensitive material sheet into a relaxation position, said relaxation position being where an intermediate point between leading and rear margins of said unexposed photosensitive material sheet is located substantially on a line drawn upright from the rotation shaft of said recording drum;

performing a relaxation treatment for ridding said unexposed photosensitive material sheet attached to the drum of distortion when said drum is at said relaxation position that includes weakening the suction force holding said unexposed photosensitive material sheet on said recording drum to a second level below said first level and maintaining said suction force below said first level for a predetermined period of time and thereafter increasing the suction force to the first level at least once again; and recording an image on said unexposed photosensitive material sheet after performing said relaxation treatment.

13. A method as defined in claim 12, wherein said step of performing said relaxation treatment is performed a plurality of times.

* * * * *